(12) United States Patent
Igarashi

(10) Patent No.: US 11,676,595 B2
(45) Date of Patent: Jun. 13, 2023

(54) INFORMATION PROCESSING DEVICE, RECEPTION DEVICE, AND INFORMATION PROCESSING METHOD

(71) Applicant: SATURN LICENSING LLC, New York, NY (US)

(72) Inventor: Tatsuya Igarashi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 17/136,928

(22) Filed: Dec. 29, 2020

(65) Prior Publication Data

US 2021/0201904 A1 Jul. 1, 2021

Related U.S. Application Data

(63) Continuation of application No. 16/303,284, filed as application No. PCT/JP2018/014732 on Apr. 6, 2018, now abandoned.

(30) Foreign Application Priority Data

Apr. 21, 2017 (JP) .............................. JP2017-084575

(51) Int. Cl.
*G10L 15/22* (2006.01)
*G10L 15/30* (2013.01)
(Continued)

(52) U.S. Cl.
CPC .............. *G10L 15/22* (2013.01); *G06F 3/167* (2013.01); *G10L 15/30* (2013.01); *G10L 19/00* (2013.01);
(Continued)

(58) Field of Classification Search
CPC ......... G10L 15/22; G10L 15/30; G10L 19/00; G10L 2015/223; G04L 65/607
(Continued)

(56) References Cited

U.S. PATENT DOCUMENTS 8,938,756 B2 1/2015 Kitazato
9,338,493 B2 5/2016 Van Os et al.
(Continued)

FOREIGN PATENT DOCUMENTS

CN 1585479 2/2005
JP 2004135133 4/2004
(Continued)

OTHER PUBLICATIONS

R. Bleidt, A. Borsum, H. Fuchs and S. M. Weiss, "Object-Based Audio: Opportunities for Improved Listening Experience and Increased Listener Involvement," in SMPTE Motion Imaging Journal, vol. 124, No. 5, pp. 1-13, Jul./Aug. 2015, doi: 10.5594/j18579. (Year: 2015).*

(Continued)

*Primary Examiner* — Bharatkumar S Shah
(74) *Attorney, Agent, or Firm* — Richard LaPeruta

(57) ABSTRACT

A reception apparatus, including processing circuitry that is configured to receive a voice command related to content from a user during presentation of the content to the user. The processing circuitry is configured to transmit the voice command to a server system for processing. The processing circuitry is configured to receive a response to the voice command from the server system. The response to the voice command is generated based on the voice command and content information for identifying the content related to the voice command.

18 Claims, 16 Drawing Sheets

(51) Int. Cl.
*H04N 21/4722* (2011.01)
*G06F 3/16* (2006.01)
*H04N 21/233* (2011.01)
*H04N 21/462* (2011.01)
*H04N 21/422* (2011.01)
*G10L 19/00* (2013.01)
*H04L 65/70* (2022.01)

(52) U.S. Cl.
CPC ..... *H04N 21/233* (2013.01); *H04N 21/42203* (2013.01); *H04N 21/4622* (2013.01); *H04N 21/4722* (2013.01); *G10L 2015/223* (2013.01); *H04L 65/70* (2022.05)

(58) Field of Classification Search
USPC ......................................................... 704/251
See application file for complete search history.

(56) References Cited

U.S. PATENT DOCUMENTS

| | | | |
|---|---|---|---|
| 9,558,784 B1* | 1/2017 | Gray | H04N 5/783 |
| 9,564,177 B1* | 2/2017 | Gray | G11B 27/007 |
| 2006/0075429 A1 | 4/2006 | Istvan et al. | |
| 2013/0002716 A1 | 1/2013 | Walker et al. | |
| 2014/0165105 A1 | 6/2014 | Mountain | |
| 2014/0195248 A1 | 7/2014 | Chung et al. | |
| 2014/0244263 A1 | 8/2014 | Pontual et al. | |
| 2015/0038047 A1 | 2/2015 | Shen et al. | |
| 2015/0339098 A1* | 11/2015 | Lee | G06F 3/0482 715/728 |
| 2015/0373428 A1 | 12/2015 | Trollope et al. | |
| 2015/0382047 A1* | 12/2015 | Van Os | H04N 21/25891 725/38 |
| 2016/0212488 A1 | 7/2016 | Van Os et al. | |
| 2016/0286244 A1 | 9/2016 | Chang et al. | |
| 2017/0230709 A1 | 8/2017 | Van Os et al. | |

FOREIGN PATENT DOCUMENTS

| | | |
|---|---|---|
| JP | 2013098998 | 5/2013 |
| JP | 2013187781 | 9/2013 |
| JP | 2014-3609 A | 1/2014 |
| JP | 2014132342 | 7/2014 |
| JP | 2014153663 | 8/2014 |
| JP | 2015-139035 A | 7/2015 |
| JP | 2015144398 | 8/2015 |
| JP | 2015163920 | 9/2015 |
| JP | 2015-194864 A | 11/2015 |
| JP | 2016-95705 A | 5/2016 |
| WO | WO 2005/071964 A1 | 8/2005 |
| WO | WO 2006/003766 A1 | 1/2006 |
| WO | WO 2017/044257 A1 | 3/2017 |
| WO | WO 2018/211983 A1 | 11/2018 |

OTHER PUBLICATIONS

A. I. Niculescu, K. H. Yeo, L. F. D'Haro, S. Kim, R. Jiang and R. E. Banchs, "Design and evaluation of a conversational agent for the touristic domain," Signal and Information Processing Association Annual Summit and Conference (APSIPA), 2014 Asia-Pacific, 2014, pp. 1-10, doi: 10.1109/APSIPA.2014. (Year: 2014).*
International Search Report dated Jun. 7, 2018 in PCT/JP2018/014732, 5 pages.

* cited by examiner

[Fig. 4]

[Fig. 11]
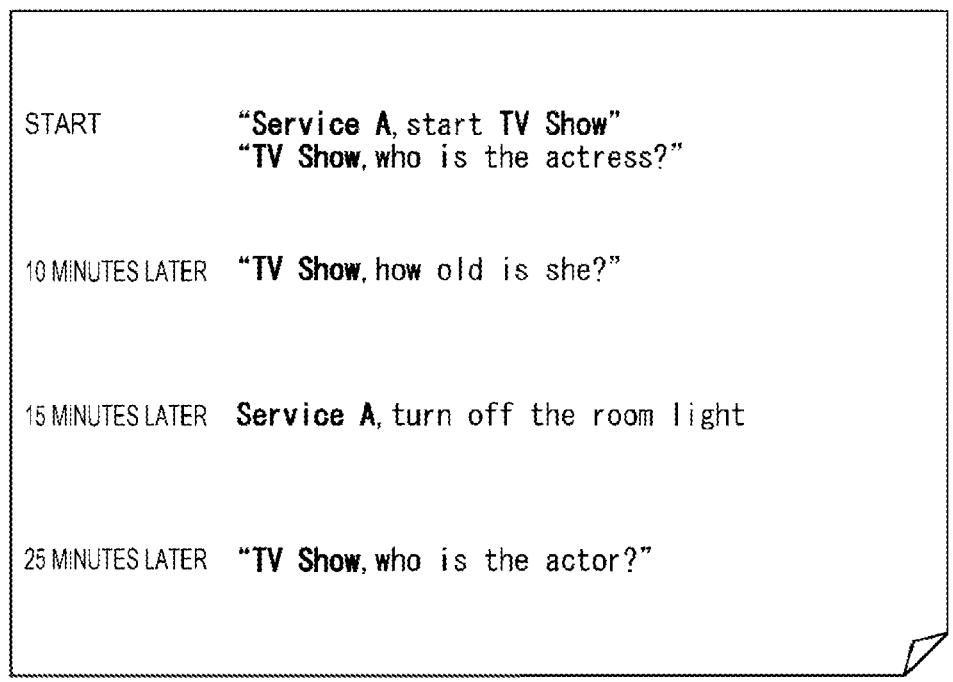
| START | "Service A, start TV Show"<br>"TV Show, who is the actress?" |
| --- | --- |
| 10 MINUTES LATER | "TV Show, how old is she?" |
| 15 MINUTES LATER | Service A, turn off the room light |
| 25 MINUTES LATER | "TV Show, who is the actor?" |
[Fig. 12]
| ACTIVATION KEYWORD | FUNCTION |
| --- | --- |
| TV Show | TV Show FUNCTION |
| ⋮ | ⋮ |

[Fig. 14]

[Fig. 16]
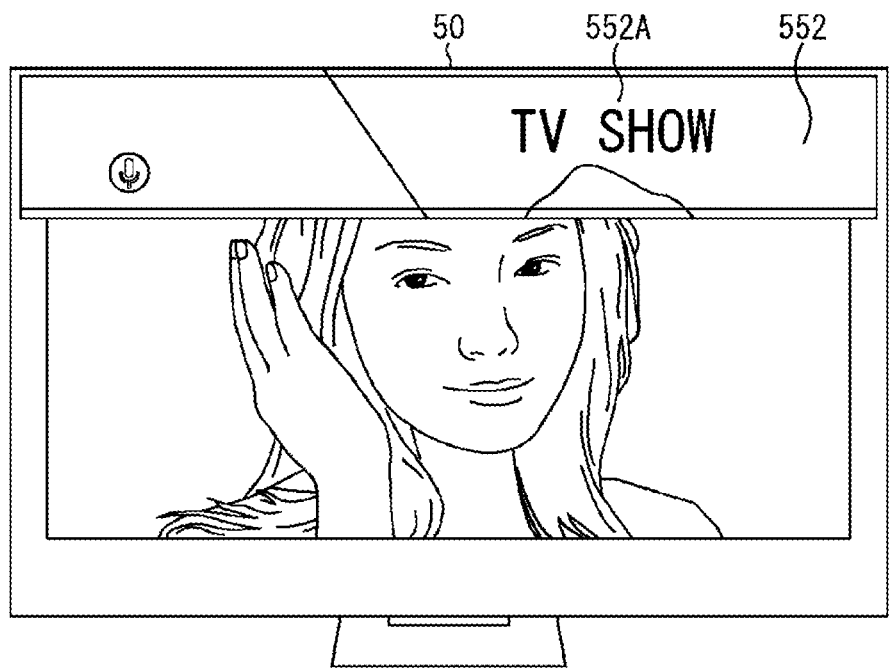
[Fig. 17]
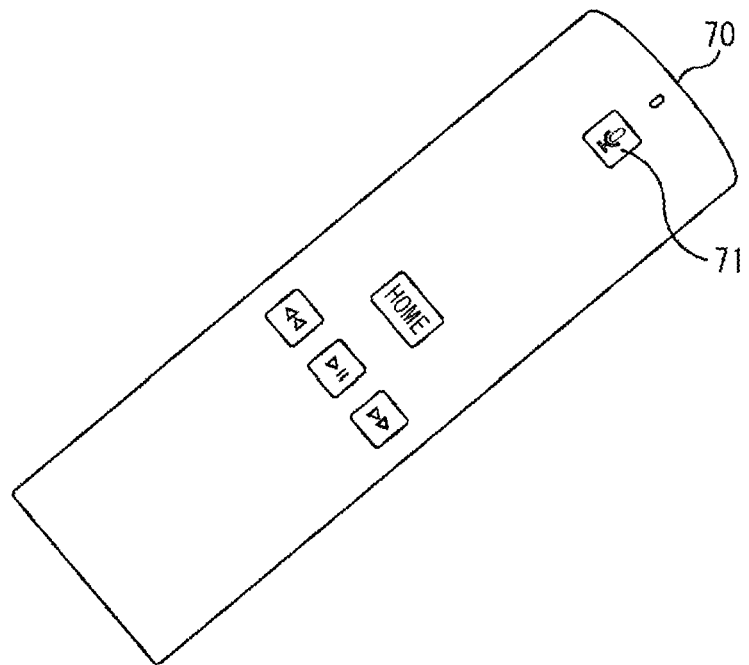

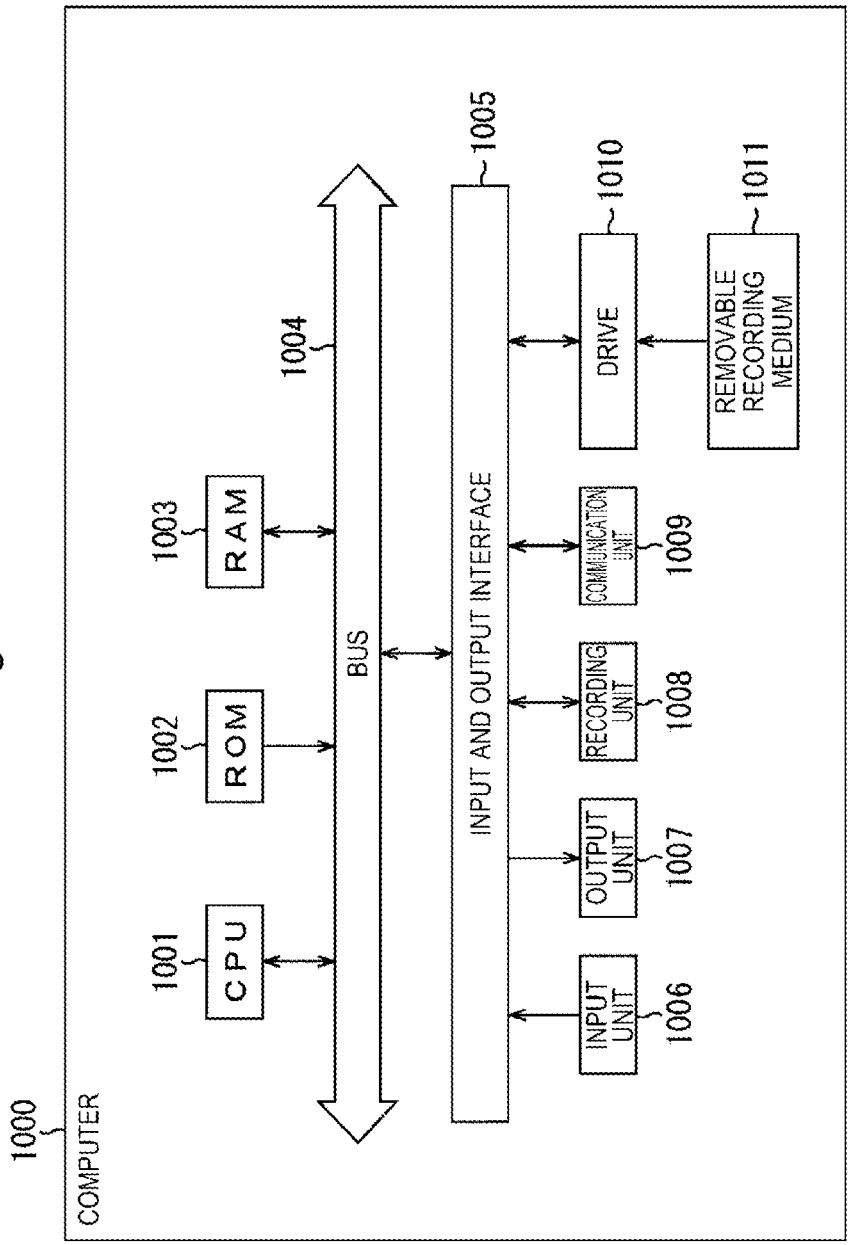

INFORMATION PROCESSING DEVICE, RECEPTION DEVICE, AND INFORMATION PROCESSING METHOD

CROSS-REFERENCE TO RELATED APPLICATION

This is a continuation application of U.S. application Ser. No. 16/303,284, filed Nov. 20, 2018, which is a National Stage of International Application No. PCT/P2018/014732, filed Apr. 6, 2018, which claims the benefit Japanese Application No. 2017-084575 filed Apr. 21, 2017, the entire contents of each of which are hereby incorporated herein by reference in their entirety.

TECHNICAL FIELD

The present technology relates to an information processing device, a reception device, and an information processing method, and particularly, to an information processing device, a reception device, and an information processing method capable of achieving an improvement in convenience of an operation using a sound dialogue at the time of reproduction of content.

CROSS REFERENCE TO RELATED APPLICATIONS

This application claims the benefit of Japanese Priority Patent Application JP 2017-084575 filed Apr. 21, 2017, the entire contents of which are incorporated herein by reference.

BACKGROUND ART

Broadcast applications executed in association with broadcast content have been proposed (for example, see PTL 1). By using broadcast applications, for example, it is possible to display information related to broadcast content.

In addition, technologies for sound recognition executed to analyze speech content of users have been proposed (for example, see PTL 2). For example, when the technologies are applied to television receivers or portable terminal devices, words spoken by users can be analyzed and processes in accordance with the speech can be executed.

CITATION LIST

Patent Literature

[PTL 1]
JP 2013-187781A
[PTL 2]
JP 2014-153663A

SUMMARY OF INVENTION

Technical Problem

Incidentally, in television receivers, operations are generally executed using accessory remote controllers. However, in a case in which operations related to broadcast applications are executed at the time of reproduction of content, it may not necessarily be said to be suitable to perform operations using a remote controller and a method of performing operations using sound dialogue is desired.

It is desirable to achieve an improvement in convenience of an operation using a sound dialogue at the time of reproduction of content.

Solution to Problem

In an embodiment of the present disclosure, there is provided a reception apparatus. The reception apparatus includes processing circuitry configured to receive a voice command related to content from a user during presentation of the content to the user. The processing circuitry is configured to transmit the voice command to a server system for processing. The processing circuitry is configured to receive a response to the voice command from the server system. The response to the voice command is generated based on the voice command and content information for identifying the content related to the voice command.

In an embodiment of the present disclosure, there is provided a method for receiving a response to a voice command. The method includes receiving the voice command related to content from a user during presentation of the content to the user and transmitting, by processing circuitry of a reception apparatus, the voice command to a server system for processing. The method further includes receiving, by the processing circuitry of the reception apparatus, the response to the voice command from the server system. The response to the voice command is generated based on the voice command and content information for identifying the content related to the voice command.

In an embodiment of the present disclosure, there is provided a non-transitory computer-readable medium storing instructions which when executed by a processor cause the processor to perform a method for receiving a response to a voice command. The method includes receiving the voice command related to content from a user during presentation of the content to the user and transmitting the voice command to a server system for processing. The method further includes receiving the response to the voice command from the server system. The response to the voice command is generated based on the voice command and content information for identifying the content related to the voice command.

In an embodiment of the present disclosure, there is provided an information processing system, including processing circuitry. The processing circuitry is configured to receive, from a reception apparatus, a voice command related to content that is presented to a user and obtain content information for identifying the content related to the voice command. The processing circuitry is configured to generate a response to the voice command based on the voice command and the obtained content information for identifying the content related to the voice command. The processing circuitry is further configured to transmit, to the reception apparatus, the generated response to the voice command.

In an embodiment of the present disclosure, there is provided a method for processing a voice command. The method includes receiving, from a reception apparatus, the voice command related to content that is presented to a user and obtaining content information for identifying the content related to the voice command. The method includes generating, by processing circuitry of an information processing apparatus, a response to the voice command based on the voice command and the obtained content information for identifying the content related to the voice command. The method further includes transmitting, to the reception apparatus, the generated response to the voice command.

In an embodiment of the present disclosure, there is provided a non-transitory computer-readable medium storing instructions which when executed by a processor cause the processor to perform a method for processing a voice command. The method includes receiving, from a reception apparatus, the voice command related to content that is presented to a user and obtaining content information for identifying the content related to the voice command. The method includes generating a response to the voice command based on the voice command and the obtained content information for identifying the content related to the voice command. The method further includes transmitting, to the reception apparatus, the generated response to the voice command.

Advantageous Effects of Invention

According to the first and second embodiments of the present technology, it is possible to achieve an improvement in convenience of an operation using a sound dialogue at the time of reproduction of content.

Moreover, the advantageous effects mentioned here are not necessarily limited and any advantageous effect described in the present disclosure may be obtained.

BRIEF DESCRIPTION OF DRAWINGS

FIG. 11 is a diagram for describing an overview of a second embodiment.

FIG. 12 is a diagram illustrating an example of a table of activation keywords.

FIG. 16 is a diagram illustrating another display form of notification information.

FIG. 17 is a diagram illustrating an example of an operation device corresponding to a sound agent service.

FIG. 18 is a block diagram illustrating an example of a configuration of a computer.

DESCRIPTION OF EMBODIMENTS

Figure 1:
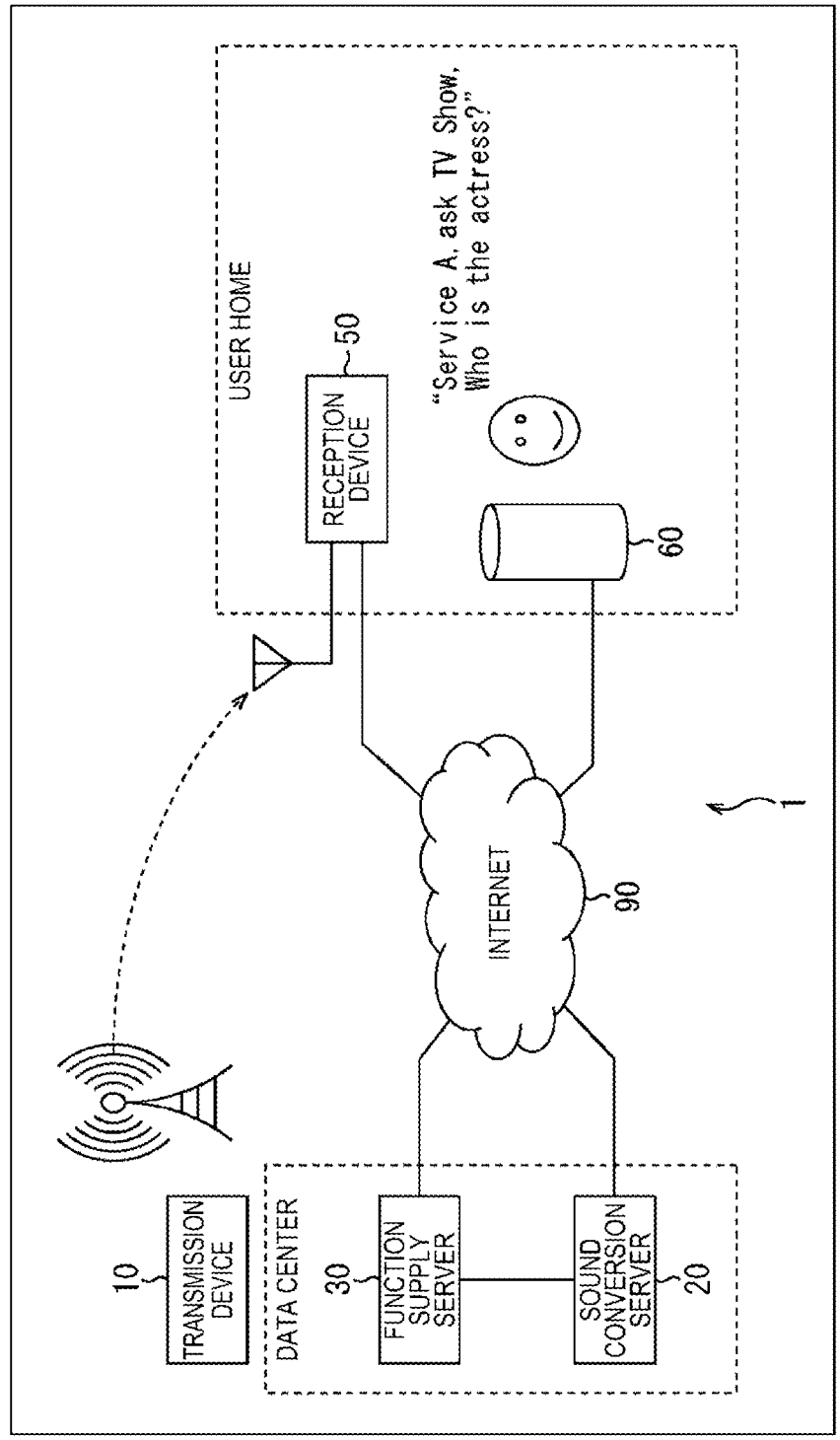
FIG. 1 is a block diagram illustrating an example of a configuration of an embodiment of a sound dialogue system to which the present technology is applied.

Hereinafter, embodiments of the present technology will be described with reference to the drawings. Moreover, the description will be made in the following order.
1. Configuration of system
2. First embodiment: sound dialogue function by application cooperation
3. Second embodiment: simplifying activation keywords
4. Third embodiment: displaying application cooperation
5. Modification examples
6. Configuration of computer 1. Configuration of System (Example of Configuration of Sound Dialogue System)

FIG. 1 is a block diagram illustrating an example of a configuration of an embodiment of a sound dialogue system to which the present technology is applied.

A sound dialogue system 1 is a system that realizes a sound dialogue with a user who is watching content. In FIG. 1, the sound dialogue system 1 includes a transmission device 10, a sound conversion server 20, a function supply server 30, a reception device 50, and a sound processing device 60.

Moreover, in the sound dialogue system 1, the sound conversion server 20, the function supply server 30, the reception device 50, and the sound processing device 60 can be connected to the Internet 90 so that various kinds of data can be exchanged.

The transmission device 10 processes broadcast content or a broadcast application and transmits the processed broadcast content or broadcast application as broadcast waves from an antenna installed in a transmission station. Moreover, as a broadcast scheme herein, for example, Advanced Television Systems Committee (ATSC) 3.0 which is one of one of the next-generation terrestrial broadcast standards can be used.

Here, broadcast content is, for example, television programs such as news, sports, drama, and shopping channels. In addition, a broadcast application is an application developed with a markup language such as HyperText Markup Language 5 (HTML5) or a script language such as JavaScript (registered trademark). Moreover, the details of broadcast applications corresponding to ATSC 3.0 are disclosed in the following NPL 1.
NPL 1: ATSC Candidate Standard ATSC 3.0 Interactive Content (A/344)

The sound conversion server 20 is a server that supplies a cloud-based sound recognition service. The sound conversion server 20 converts sound data transmitted from a device connected to the Internet 90 into text data and transmits the text data to the function supply server 30.

The function supply server 30 is a server that supplies various functions (function services) by executing processes on the text data transmitted from the sound conversion server 20. The function supply server 30 transmits processed data obtained by processing the text data to the reception device 50 or the sound processing device 60 via the Internet 90.

A function service supplied by the function supply server 30 includes, for example, a sound dialogue function with a user who is watching broadcast content. The sound dialogue function is realized by allowing the function supply server 30 to execute a server application. Moreover, the server application is developed for each function service. In addition, the sound conversion server 20 and the function supply server 30 are installed in a data center to be connectable to each other.

The reception device 50 and the sound processing device 60 are installed, for example, in the same room or different room of a user home.

The reception device 50 includes, for example, a fixed receiver such as a television receiver, a set top box (STB), a personal computer, or a game console or mobile receiver such as a smartphone, a cellular phone, or a tablet computer.

The reception device 50 reproduces broadcast content by receiving and processing the broadcast waves transmitted from the transmission station and outputs a video and a sound. In addition, the reception device 50 can execute a broadcast application obtained by processing the broadcast waves. Further, the reception device 50 receives the processed data transmitted from the function supply server 30 via the Internet 90 and outputs a sound appropriate for the processed data.

The sound processing device 60 is, for example, a speaker which can be connected to a network such as a home Local Area Network (LAN) and is also referred to as a so-called smart speaker. For example, such a type of speaker can reproduce music and can also execute a sound operation on a device such as lighting equipment or air conditioning equipment. Moreover, the sound processing device 60 may be connected to various devices through wireless communication such as Bluetooth (registered trademark).

In addition, the sound processing device 60 can supply a sound agent service (a user interface of the sound agent service) to the user in cooperation with the sound conversion server 20 or the function supply server 30 via the Internet 9W.

Here, the sound agent service refers to a function or a service in which processes such as a sound recognition process and natural language processing are combined and a reply or an operation is appropriately executed in response to a question or a request by spoken words. That is, the sound processing device 60 is installed on a client side and functions as a user interface of the sound agent service. In addition, the sound conversion server 20 or the function supply server 30 is installed on a server side such as the data center and executes a process of realizing a sound dialogue function.

The sound processing device 60 receives a sound uttered by the user and transmits sound data to the sound conversion server 20 via the Internet 90. In addition, the sound processing device 60 receives processed data transmitted from the function supply server 30 via the Internet 90 and outputs a sound appropriate for the processed data.

(Example of Configuration of Transmission Device)

Figure 2:
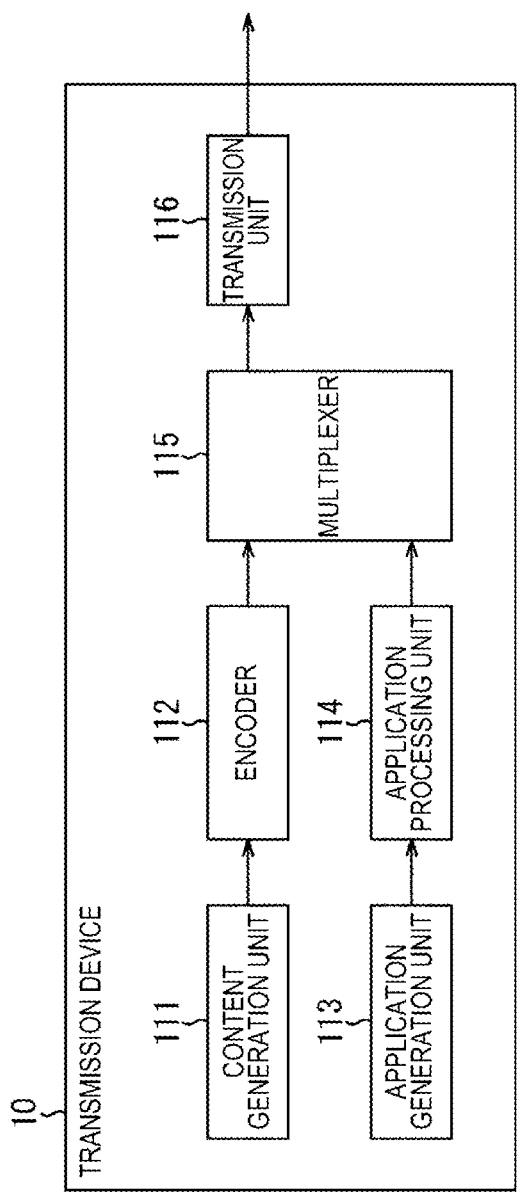
FIG. 2 is a block diagram illustrating an example of a configuration of a transmission device.

FIG. 2 is a block diagram illustrating an example of a configuration of the transmission device 10 in FIG. 1.

In FIG. 2, the transmission device 10 includes a content generation unit 111, an encoder 112, an application generation unit 113, an application processing unit 114, a multiplexer 115, and a transmission unit 116.

The content generation unit 111 generates broadcast content and supplies the generated broadcast content to the encoder 112. Moreover, the broadcast content may also be acquired from an external server, a camera, a recording medium, or the like.

The encoder 112 encodes sound data and video data included in the broadcast content supplied from the content generation unit 111 in conformity with a predetermined encoding scheme and supplies the encoded sound data and video data to the multiplexer 115.

The application generation unit 113 generates a broadcast application and supplies the generated broadcast application to the application processing unit 114. Moreover, the broadcast application may also be acquired from an external server, a recording medium, or the like.

The application processing unit 114 executes a necessary process on data of the broadcast application supplied from the application generation unit 113 and supplies data obtained as a result to the multiplexer 115.

The multiplexer 115 multiplexes the data from the encoder 112 and the data from the application processing unit 114 and supplies a stream obtained as a result to the transmission unit 116.

The transmission unit 116 executes a necessary process (for example, an error correction encoding process or a modulation process) on the stream supplied from the multiplexer 115 and transmits a signal obtained as a result as broadcast waves from the antenna installed on the transmission station.

(Example of Configuration of Servers)

Figure 3:
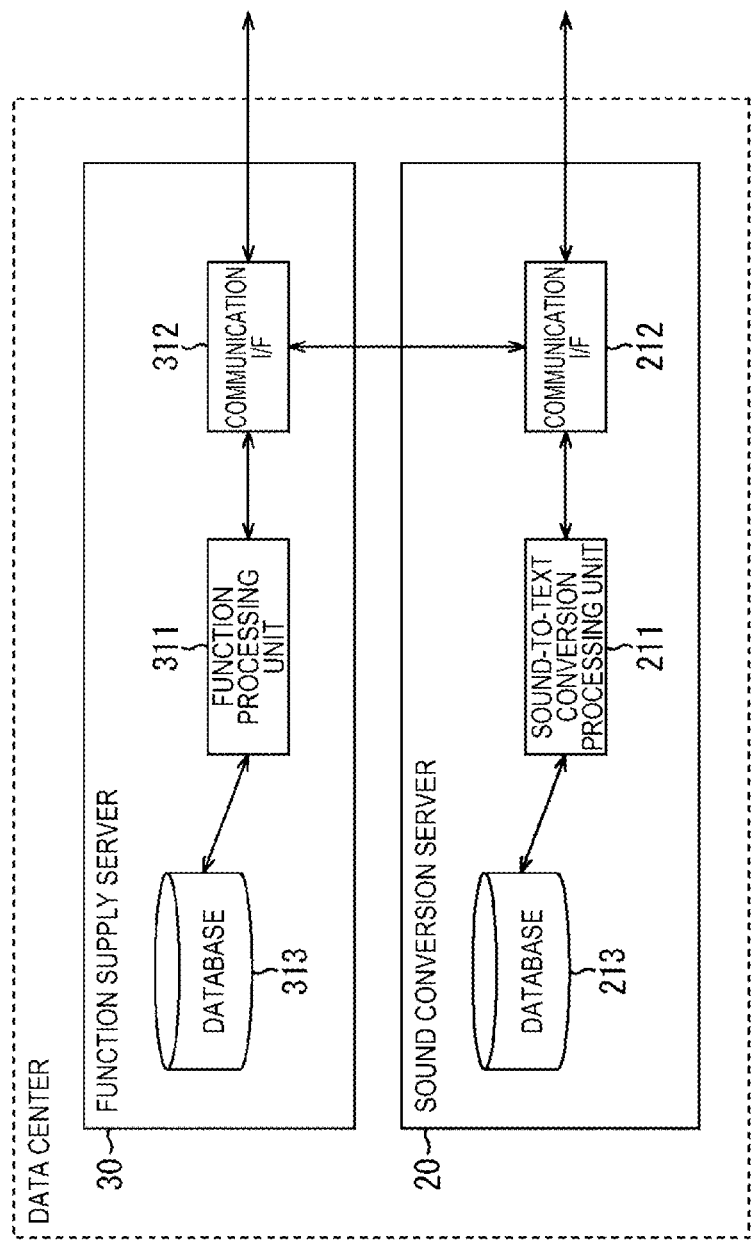
FIG. 3 is a block diagram illustrating examples of configurations of a sound conversion server and a function supply server.

FIG. 3 is a block diagram illustrating examples of configurations of the sound conversion server 20 and the function supply server 30 in FIG. 1.

In FIG. 3, the sound conversion server 20 includes a sound-to-text conversion processing unit 211, a communication I/F 212, and a database 213.

The sound-to-text conversion processing unit 211 includes an arithmetic device such as a central processing unit (CPU) or a microprocessor. In addition, the communication I/F 212 includes a communication interface circuit. The database 213 includes a large-capacity recording device such as a hard disk drive (HDD) or a semiconductor memory.

The sound-to-text conversion processing unit 211 converts sound data into text data with reference to the database 213. Here, for example, the database 213 accumulates a massive sound database, and thus the sound-to-text conversion processing unit 211 can use a predetermined recognition algorithm and can convert sound data input to the predetermined recognition algorithm into text data.

The communication IF 212 receives sound data transmitted from a device such as the sound processing device 60 via the Internet 90 and supplies the sound data to the sound-to-text conversion processing unit 211. In addition, the communication I/F 212 transmits text data supplied from the sound-to-text conversion processing unit 211 to the function supply server 30.

In addition, in FIG. 3, the function supply server 30 includes a function processing unit 311, a communication I/F 312 and a database 313.

The function processing unit 311 includes an arithmetic device such as a CPU or a microprocessor. In addition, the communication I/F 312 includes a communication interface circuit. The database 313 includes a large-capacity recording device such as a hard disk drive (HDD) or a semiconductor memory.

The function processing unit 311 executes a process of supplying various function services by executing a server application developed for each function. For example, the function processing unit 311 executes a process related to a sound dialogue with the user who is watching broadcast content by executing a broadcast application that has a sound dialogue function (hereinafter also referred to as a TV show function) of realizing the sound dialogue with the user who is watching the broadcast content.

Here, reproduction information regarding reproduction target broadcast content can be obtained by allowing a broadcast application executed by the reception device 50 on the client side to cooperate with a server application executed by the function supply server 30 on the server side. Thus, the function processing unit 311 can execute a dialog process of answering to speech of the user in accordance with text data from the sound conversion server 20 on a basis of dialogue information narrowed down by the reproduction information among dialogue information included in the database 313.

Figure 4:
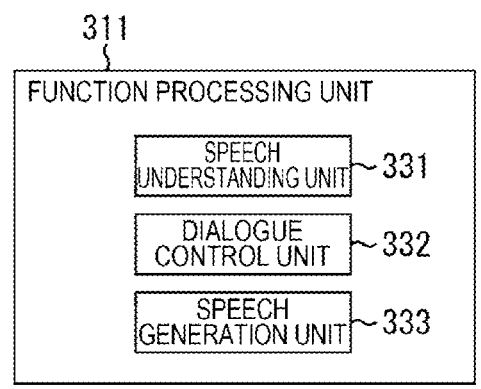
FIG. 4 is a block diagram illustrating an example of a detailed configuration of a function processing unit.

Here, FIG. 4 is a block diagram illustrating an example of a detailed configuration of the function processing unit 311. As illustrated in FIG. 4, the function processing unit 311 includes a speech understanding unit 331, a dialogue control unit 332, and a speech generation unit 333.

The speech understanding unit 331 analyzes the text data from the sound conversion server 20 with reference to the database 313 and executes a process of understanding a topic or an intention of a speech of the user on a basis of a context.

The dialogue control unit 332 executes a process of deciding which answer is to be executed on the basis of the topic, the speech intention of the user, a history of a previous dialogue history, or the like obtained by referring to the database 313 or a processing result of the speech understanding unit 331.

The speech generation unit 333 executes a process of generating a speech (an answer to the speech of the user) in accordance with the intention of the user on a basis of a processing result of the dialogue control unit 332 or information obtained by referring to the database 313.

Moreover, the database 313 can include a database such as a speech history or user information in addition to a knowledge database or a speech database as a database for obtaining dialogue information for realizing a speech function.

Referring back to FIG. 3 for the description, the communication I/F 312 receives the text data transmitted from the sound conversion server 20 and supplies the text data to the function processing unit 311. In addition, the communication OF 312 receives reproduction information transmitted from the reception device 50 via the Internet 9U and supplies the reproduction information to the function processing unit 311. In addition, the communication I/F 312 transmits an answer (the answer to the speech of the user) supplied from the function processing unit 311 to a device such as the reception device 50 or the sound processing device 60 via the Internet 90.

(Example of Configuration of Reception Device)

Figure 5:
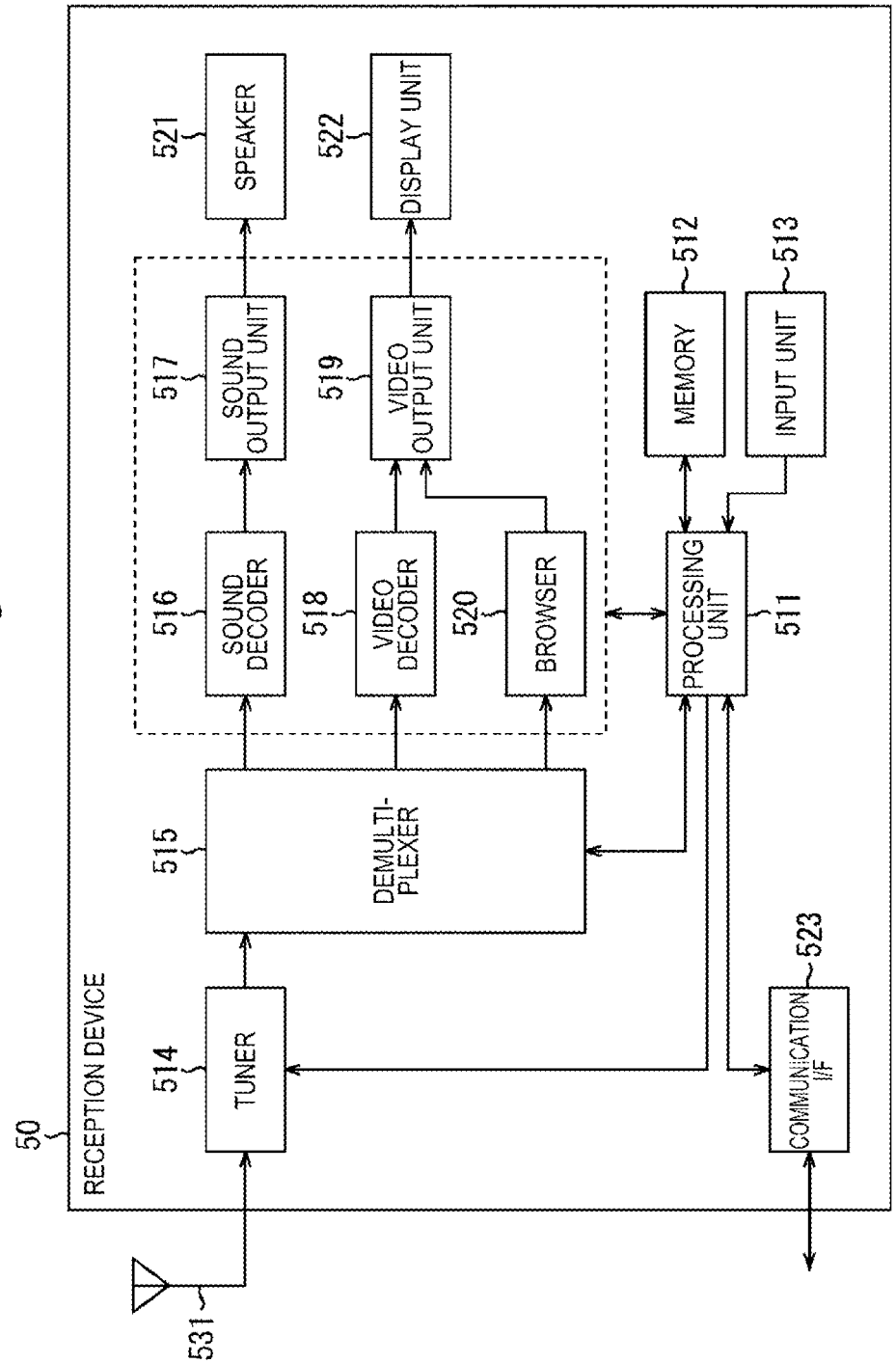
FIG. 5 is a block diagram illustrating an example of a configuration of a reception device.

FIG. 5 is a block diagram illustrating an example of a configuration of the reception device 50 in FIG. 1.

In FIG. 5, the reception device 50 includes a processing unit 511, a memory 512, an input unit 513, a tuner 514, a demultiplexer 515, a sound decoder 516, a sound output unit 517, a video decoder 518, a video output unit 519, a browser 520, a speaker 521, a display unit 522, and a communication I/F 523.

The processing unit 511 includes, for example, a CPU or a microprocessor. The processing unit 511 operates as a central processing device for various arithmetic processes, operational control of each unit, and the like in the reception device 50. The processing unit 511 can exchange various kinds of data between the units in the reception device 50.

The memory 512 is a nonvolatile memory such as a nonvolatile RAM (NVRAM) and records various kinds of data under control from the processing unit 511. The input unit 513 is, for example, a physical button or the like and supplies an operation signal appropriate for an operation by the user to the processing unit 511. The processing unit 511 controls an operation of each unit on the basis of the operation signal supplied from the input unit 513.

The tuner 514 executes a necessary process (for example, a demodulation process, an error correction decoding process, or the like) by receiving the broadcast waves transmitted from the transmission device 10 via an antenna 531 and supplies a stream obtained as a result to the demultiplexer 515.

The demultiplexer 515 demultiplexes the stream supplied from the tuner 514 into sound data, video data, and data of the broadcast application. The demultiplexer 515 supplies the sound data to the sound decoder 516, supplies the video data to the video decoder 518, and supplies the data of the broadcast application to the browser 520.

The sound decoder 516 decodes the sound data supplied from the demultiplexer 515 in conformity with a predetermined decoding scheme and supplies the decoded sound data to the sound output unit 517. The sound output unit 517 supplies the sound data supplied from the sound decoder 516 to the speaker 521. Thus, a sound of the broadcast content is output from the speaker 521.

The video decoder 518 decodes the video data supplied from the demultiplexer 515 in conformity with a predetermined decoding scheme and supplies the decoded video data to the video output unit 519. The video output unit 519 supplies the video data supplied from the video decoder 518 to the display unit 522. Thus, a video of the broadcast content is displayed on the display unit 522 including a display such as a liquid crystal display (LCD) or an organic light emitting diode (OLED).

The browser 520 is a browser corresponding to, for example, HTML5 or JavaScript (registered trademark). The browser 520 processes the data of the broadcast application supplied from the demultiplexer 515 under control of the processing unit 511 and supplies the processed data to the video output unit 519. The video output unit 519 displays an application appropriate for the data supplied from the browser 520 so that the application is superimposed on the video appropriate for the video data supplied from the video decoder 518.

The communication I/F 523 includes a communication interface circuit. The communication I/F 523 accesses each server (for example, the function supply server 30 in FIG. 1) connected to the Internet 90 under control of the processing unit 511 to exchange various kinds of data.

(Example of Configuration of Sound Processing Device)

Figure 6:
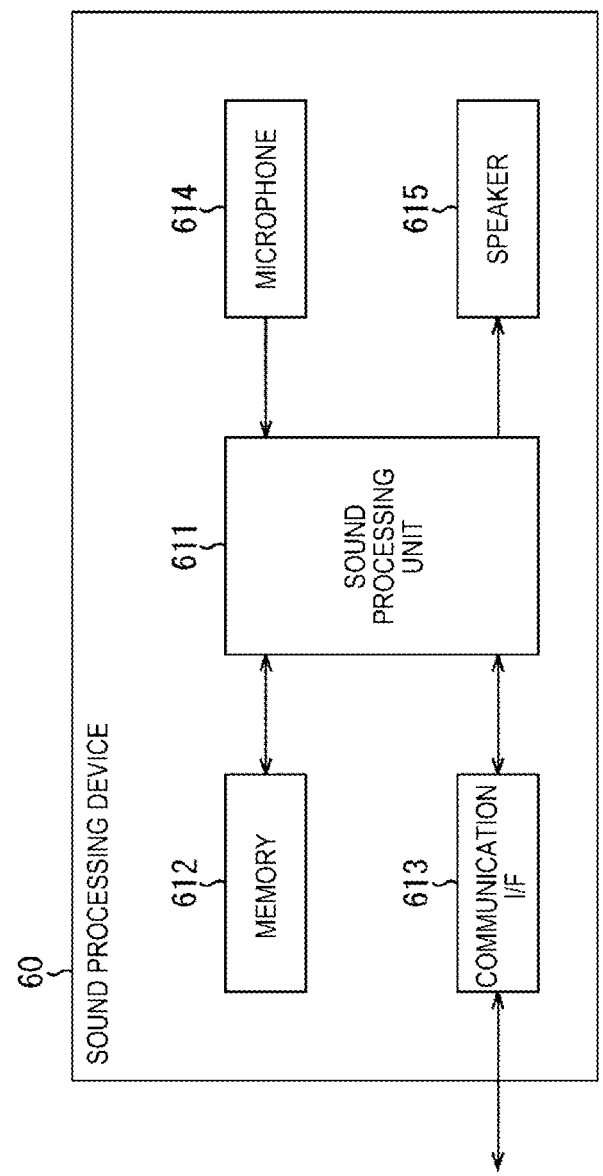
FIG. 6 is a block diagram illustrating an example of a configuration of a sound processing device.

FIG. 6 is a block diagram illustrating an example of a configuration of the sound processing device 60 of FIG. 1.

In FIG. 6, the sound processing device 60 includes a sound processing unit 611, a memory 612, a communication I/F 613, a microphone 614, and a speaker 615.

The sound processing unit 611 includes, for example, a CPU or a microprocessor. The sound processing unit 611 operates as a central processing device for various arithmetic processes, operational control of each unit, and the like in the sound processing device 60.

The memory 612 is a nonvolatile memory such as a NVRAM and records various kinds of data under control from the sound processing unit 611.

The communication I/F 613 includes a communication interface circuit. The communication I/F 613 accesses each server (for example, the sound conversion server 20 or the function supply server 30 in FIG. 1) connected to the Internet 90 under control of the sound processing unit 611 to exchange various kinds of data.

The microphone 614 is a device (sound collector) that converts a sound from the outside into an electric signal. The microphone 614 supplies a sound signal obtained through the conversion to the sound processing unit 611.

The sound processing unit 611 processes the sound signal supplied from the microphone 614 and supplies the processed sound signal to the communication I/F 613. In addition, the sound processing unit 611 processes the sound signal supplied from the communication I/F 613 and supplies the processed sound signal to the speaker 615.

The speaker 615 is a device that changes the electric signal into physical vibration and outputs the sound. The speaker 615 outputs a sound appropriate for the sound signal supplied from the sound processing unit 611.

The sound dialogue system 1 has the above-described configuration.

Moreover, to facilitate the description, the case in which one transmission device 10 and one pair of sound conversion server 20 and function supply server 30 are installed in the sound dialogue system 1 is illustrated. However, the plurality of transmission devices 10 or the plurality of function supply servers 30 may be installed for each service provider such as a broadcast station.

In addition, the case in which one reception device 50 and one sound processing device 60 are installed in the sound dialogue system 1 of FIG. 1 at each user home is illustrated. However, for example, the reception device 50 and the sound processing device 60 can each be installed for a plurality of user homes.

2. First Embodiment

Incidentally, in the sound dialogue system 1 of FIG. 1, the reception device 50 including a television receiver can execute the broadcast application along with the broadcast content. However, in a case in which the broadcast application is operated, a user may feel difficult to execute an operation when the user uses an accessory remote controller of the television receiver or the like.

Accordingly, in the present technology, an improvement in convenience of an operation is achieved by allowing a broadcast application executed by the reception device 50 on the client side to cooperate with a server application executed by the function supply server 30 on the server side so that a user interface of the sound agent service supplied by the sound processing device 60 can be used with the broadcast application executed by the reception device 50.

Figure 7:
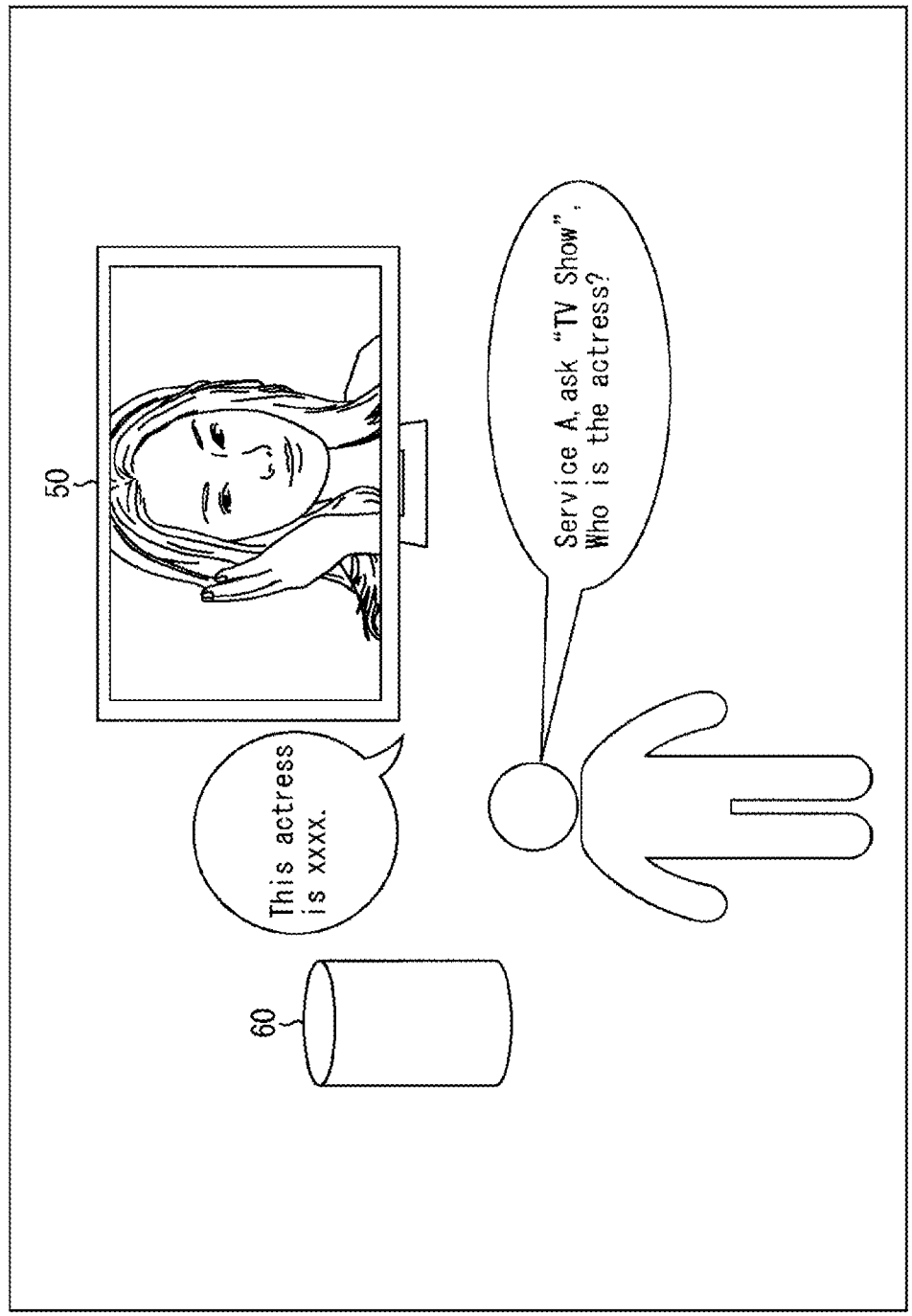
FIG. 7 is a diagram for describing an overview of a first embodiment.

For example, as illustrated in FIG. 7, when the user who is watching a drama which is broadcast content reproduced by the reception device 50 including a television receiver desires to know the name of an actress shown in the drama and questions "Who is the actress?" at that place, the name of the actress can be obtained as a relay.

Specifically, by allowing the broadcast application executed by the reception device 50 to cooperate with the server application executed by the function supply server 30, the user interface of the sound agent service supplied by the sound processing device 60 can be used. Therefore, the question "Who is the actress?" spoken by the user is received by the sound processing device 60 and is sent to the sound conversion server 20 and the function supply server via the Internet 90.

The question from the user is processed in the sound conversion server 20 and the function supply server 30 and the reply to the question is generated. The reply is transmitted to the reception device 50 via the Internet 90 and a sound corresponding to the reply "This actress is xxxx" (where xxxx is the name of the actress) is output from the speaker 521 by the broadcast application. Thus, the user can know the name of the actress shown in the drama at that place by merely questioning while the user is watching the drama.

Moreover, in the example of FIG. 7, the case in which the broadcast application outputs the sound corresponding to the reply is illustrated, but the present technology is not limited to the sound output from the speaker 521. In the reception device 50, text information, image information, or the like corresponding to the reply may be displayed on a screen of the display unit 522 by the broadcast application.

In addition, in the example of FIG. 7, the speaker 521 contained in the reception device 50 outputs the sound corresponding to the reply, but the sound corresponding to the reply may be output from the speaker 615 contained in the sound processing device 60. In this case, the processed data processed by the sound conversion server 20 and the function supply server 30 is transmitted to the sound processing device 60 via the Internet 90.

Here, in a case in which a watching position of the user who is watching the broadcast content is considered with respect to an installation position of the reception device 50 such as a television receiver and an installation position of the sound processing device 60 serving as a smart speaker at the user home, there is a high possibility of the user generally being closer to the reception device 50 than the sound processing device 60. Therefore, it is assumed that it is better to output the sound corresponding to the reply from the speaker 521 of the reception device 50 in many cases.

In addition, in order to validate (activate) the sound processing device 60 that functions as a user interface of the sound agent service, it is general to use a keyword determined in advance (hereinafter referred to as an activation keyword). Here, since "Service A" is set as the activation keyword for using the sound dialogue function (TV show function) a question "Service A, ask TV Show Who is the actress?" from the user includes the activation keyword "Service A" and "ask TV Show" for specifying a dialogue in the TV Show function.

(Sound Dialogue Processing)

Next, a flow of sound dialogue processing executed by the sound dialogue system 1 of FIG. 1 will be described with reference to the flowcharts of FIGS. 8 and 9.

Figure 8:
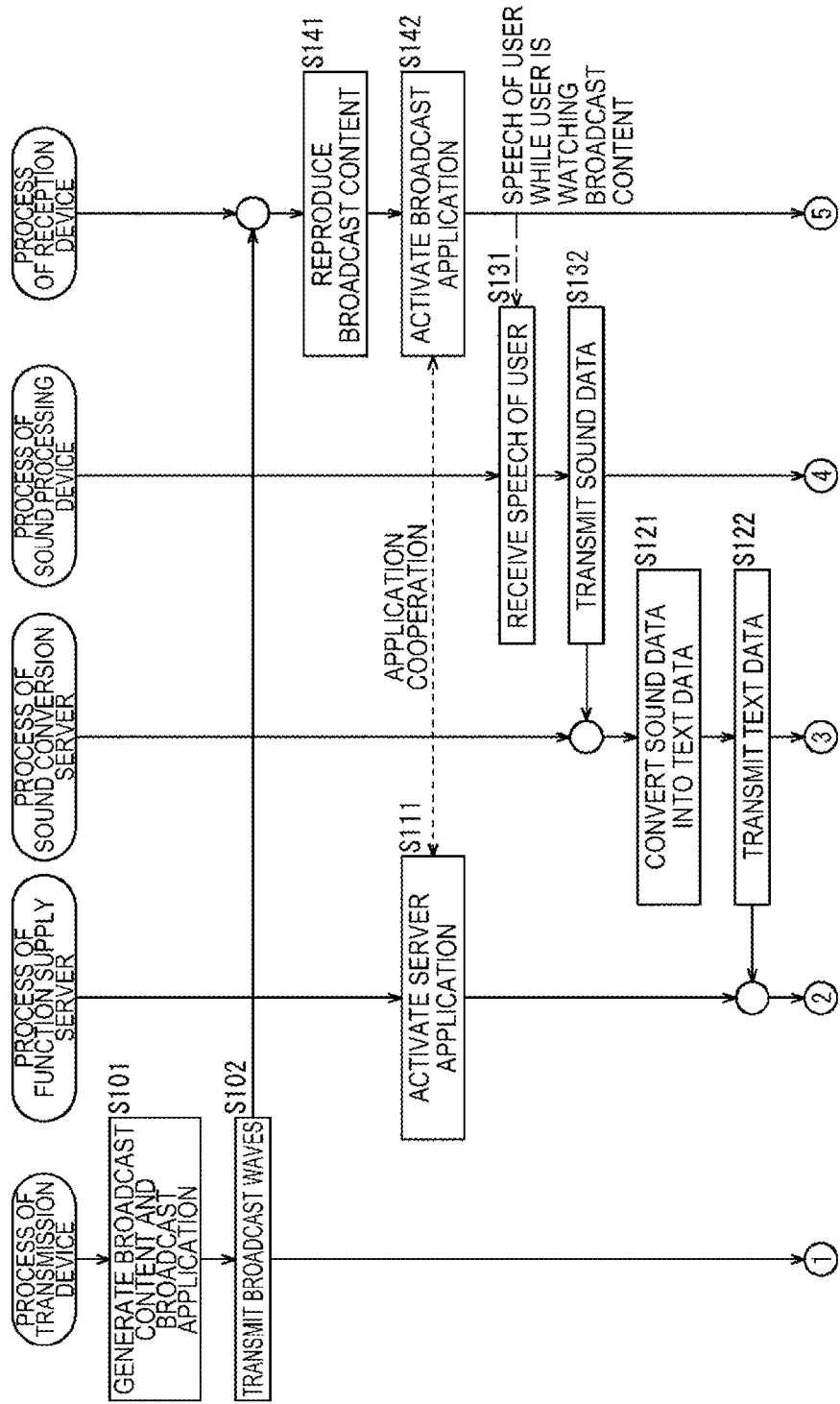
FIG. 8 is a flowchart for describing a flow of sound dialogue processing.
Figure 9:
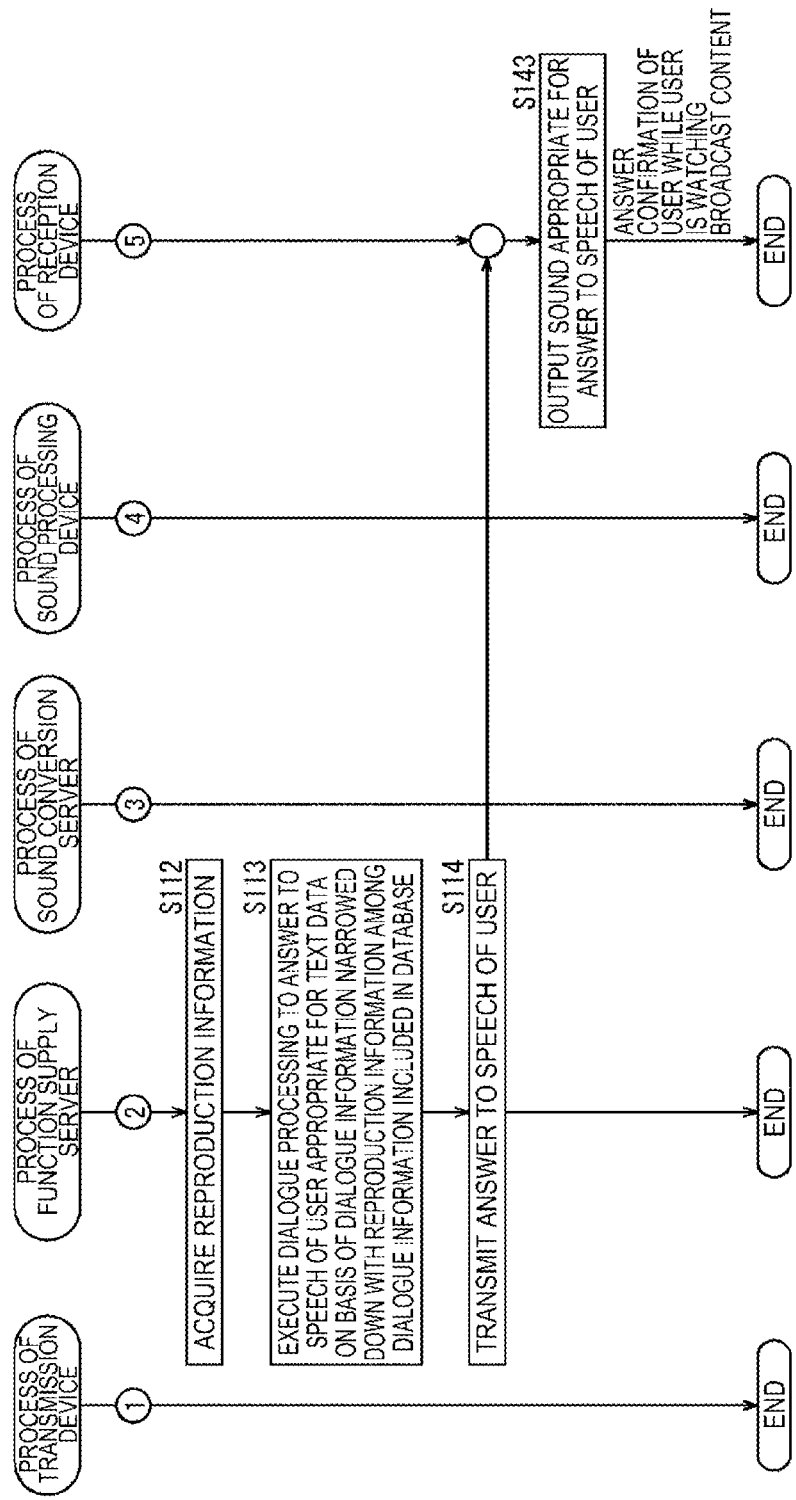
FIG. 9 is a flowchart for describing a flow of sound dialogue processing.

Here, in FIGS. 8 and 9, processes of steps S101 and S102 are executed by the transmission device 10 installed in a facility of the broadcast station or the transmission station. Processes of steps S111 to S114 and processes of steps S121 and S122 are executed by the function supply server 30 and the sound conversion server 20 installed in the data center, respectively.

In addition, in FIGS. 8 and 9, processes of steps S131 and S132 and processes of steps S141 to S143 are executed by the sound processing device 60 and the reception device 50 installed at the user home, respectively.

In step S101, the content generation unit 111 generates broadcast content. In addition, in step S101, the application generation unit 113 generates a broadcast application.

The broadcast content and the broadcast application generated in the process of step S101 are subjected to a predetermined process such as encoding, an error correction coding process, or a modulation process, and are subsequently transmitted as broadcast waves (broadcast signals) from an antenna installed in the transmission station (S102).

The broadcast waves (broadcast signals) transmitted from the transmission station are received by the antenna 531 connected to the reception device 50 and the processes of steps S141 and S142 are executed.

In the reception device 50, the tuner S14, the sound decoder 516, the video decoder 518, and the like execute predetermined processes such as a decoding process, an error correction decoding process, and decoding on the broadcast waves received by the antenna 531 to reproduce the broadcast content (S141). Here, for example, a television program such as a drama is reproduced in response to a tuning operation by the user.

In addition, in the reception device 50, the broadcast application obtained from the broadcast waves is activated by the browser 520 (S142). The broadcast application operates in cooperation with the broadcast content. On the other hand, in the function supply server 30, the server application is activated by the function processing unit 311 (S111).

Here, the broadcast application executed by the reception device 50 on the client side and the server application executed by the function supply server 30 on the server side cooperate with each other via the Internet 90, and the user interface of the sound agent service supply by the sound processing device 60 can be used with the broadcast application. Moreover, the details of the cooperation process of the broadcast application and the server application will be described later with reference to the flowchart of FIG. 10.

Thereafter, when the user who is watching the broadcast content reproduced by the reception device 50 speaks, the speech by the user is received by the sound processing unit 611 of the sound processing device 60 that functions as the user interface of the sound agent service (S131).

For example, when the user who is watching the drama questions about the name of the actress shown in the drama, the question (for example, the question "Who is the actress?") is collected by the microphone 614, is converted into an electric signal, and is supplied to the sound processing unit 611. In this way, the question of the user is received.

Moreover, as described above, actually, the user necessarily says the activation keyword such as "TV Show" when the user questions. Here, the description thereof will be omitted to facilitate the description. The details of the activation keyword will be described later.

The sound data of the user's speech received in this way is transmitted to the sound conversion server 20 via the Internet 90 by the communication I/F 613 of the sound processing device 60 via the Internet 90 (S132).

The sound data transmitted from the sound processing device 60 is received by the sound conversion server 20 via the Internet 90, and the processes of steps S121 and S122 are executed.

In step S21, the sound-to-text conversion processing unit 211 converts the sound data from the sound processing device 60 into the text data with reference to the database 213. The text data converted through the process of step S121 is transmitted to the function supply server 30 (S122). The text data from the sound conversion server 20 is received by the function supply server 30, and the processes of steps S112 to S114 are executed.

In step S112, the function processing unit 311 acquires reproduction information. Here, since the broadcast application and the server application cooperate with each other, the reproduction information can be acquired from the broadcast application by the server application. For example, the reproduction information includes information, such as an identifier, a reproduction time position, and a language of a sound or subtitles of the broadcast content, regarding the broadcast content which the user is watching.

In step S113, the function processing unit 311 executes dialogue processing to make an answer (an answer to the speech of the user) to the text data from the sound conversion server 20 on the basis of the dialogue information narrowed down with the reproduction information acquired in the process of step S112 among the dialogue information included in the database 313.

For example, when the user who is watching the drama desires to know the name of the actress shown in the drama and questions "Who is the actress?," the sound of the question is received by the sound processing device 60 and is transmitted to the sound conversion server 20 via the Internet 90. In the sound conversion server 20, the sound data "Who is the actress?" is converted into the text data to be transmitted to the function supply server 30.

On the other hand, in the function supply server 30, the information indicating the identifier, the production time position, the language of the sound or the subtitles of the drama which the user is watching is acquired as the reproduction information. Then, the function supply server 30 (the function processing unit 311 of the function supply server 30) can restrict a range of the dialogue information for realizing the sound dialogue function to a period of time in which the drama which the user is watching by narrowing down the massive database accumulated in the database 313 with the reproduction information.

Moreover, any of various processes can be used as the dialogue processing executed here. For example, the following process can be used.

That is, in the function processing unit 311, the speech understanding unit 331 first analyzes the text data from the sound conversion server 20 and understands a topic or an intention of the speech of the user on a basis of a context. Subsequently, the dialogue control unit 332 decides which answer is executed on the basis of the topic or the intention of the speech of the user understood by the speech understanding unit 331, a history of the previous dialogues, or the like. Finally, the speech generation unit 333 generates a speech (the answer to the speech of the user) appropriate for the intention of the user on a basis of a decision result by the dialogue control unit 332.

At this time, the speech understanding unit 331 to the speech generation unit 333 execute the processes with reference to the database 313. However, the dialogue information included in the database 313 is narrowed down with the reproduction information, the dialogue processing can be executed based on the restricted dialogue information.

Here, the database 313 may include a database such as a speech history or user information in addition to a knowledge database or a speech database as the databases for obtaining the dialogue information for realizing the sound dialogue function. Moreover, the dialogue processing exemplified herein is merely an example and a technology of known dialogue processing may be used.

The answer obtained in this way (the answer to the speech of the user) is transmitted to the reception device 50 via the Internet 90 by the communication I/F 312 of the function supply server 30 (S14).

The answer transmitted from the function supply server 30 is received by the reception device 50 via the Internet 90 and the process of step S43 is executed. That is, the reception device 50 (the broadcast application executed by the reception device 50) outputs the sound appropriate for the answer (the answer to the speech of the user) from the function supply server 30 from the speaker 521 (S143).

For example, when the user questions about the name of the actress shown in the drama which the user is watching, a sound corresponding to the reply "This actress is xxxx" (where "xxxx" is the name of the actress) is output as the answer to the question (for example, the question "Who is the actress?"). Thus, the user who is watching the drama can know the name of the actress shown in the drama.

Moreover, as described above, in the reception device 50, information appropriate for the answer from the function supply server 30 may be displayed on a screen of the display unit 522. In addition, the sound appropriate for the answer from the function supply server 30 may be output from the speaker 615 of the sound processing device 60.

In addition, in the above-described description, the broadcast application cooperating with the server application is assumed to notify of the reproduction information, as described above. However, the reproduction information may be notified of by a resident application of the reception device 50 or may be notified of using an application programming interface (API) of the reception device 50 by the broadcast application. In short, the server application may acquire the reproduction information and any notification way can be used. Moreover, the resident application is an application embedded in advance in the reception device 50.

The flow of the sound dialogue processing has been described above, (Application Cooperation Process)

Next, an application cooperation process corresponding to the processes of steps S111 and S142 of FIG. 8 will be described with reference to the flowchart of FIG. 10.

Figure 10:
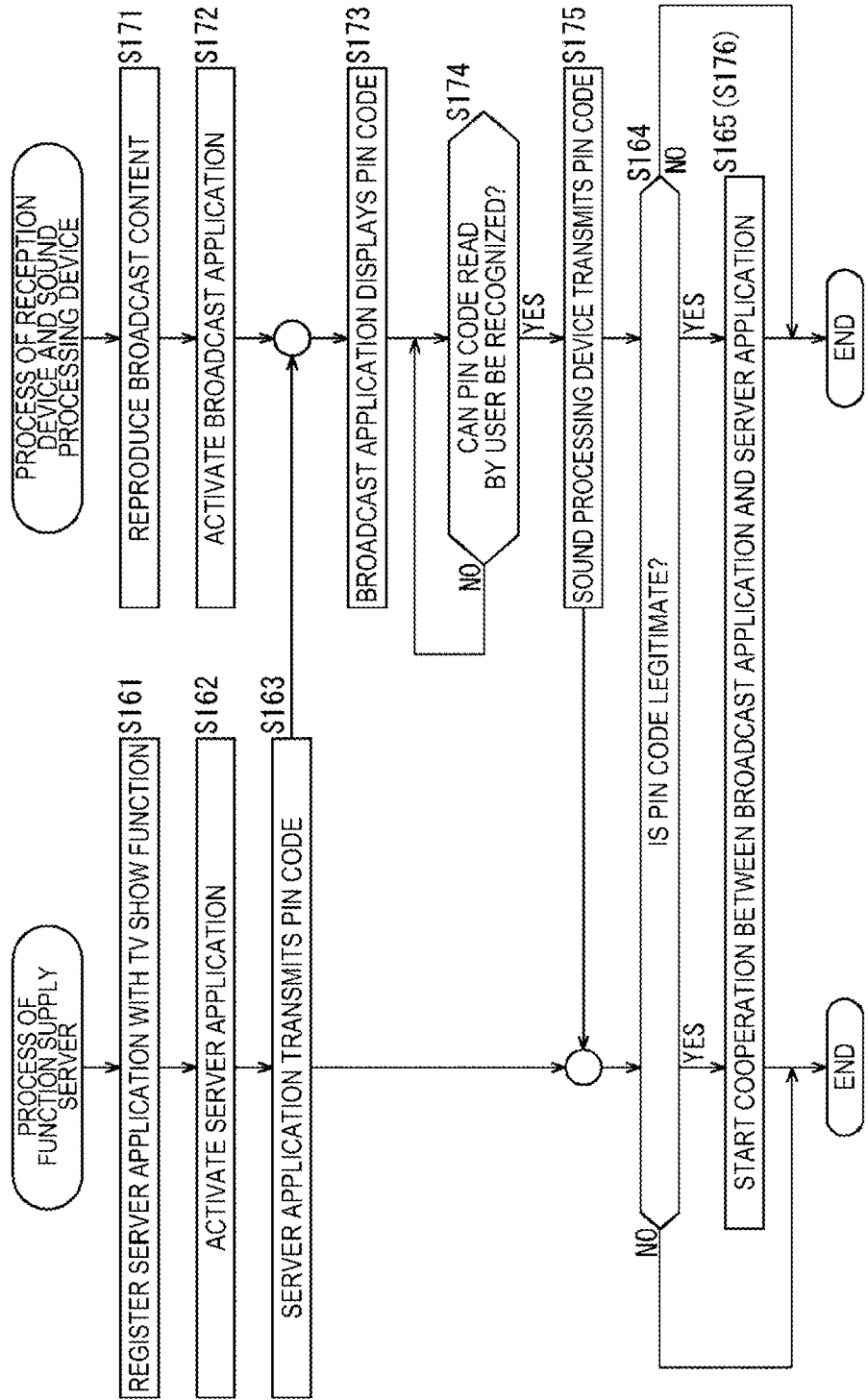
FIG. 10 is a flowchart for describing a flow of an application cooperation process.

Here, in FIG. 10, the processes of steps S161 to S165 are executed by the function supply server 30 installed in the data center. In addition, the processes of steps S171 to S176 are executed by the reception device 50 or the sound processing device 60 installed at the user home.

When the function processing unit 311 of the function supply server 30 registers a server application with a TV show function as the server application for using the sound agent service (S161) the server application is activated (S162).

On the other hand, in the reception device 50, the broadcast content is reproduced (S171). Further, the broadcast application is activated (S172).

In this way, in a situation in which the server application is activated in the function supply server 30 on the server side and the broadcast application is activated in the reception device 50 on the client side, the server application generates a personal identification number (PIN) code and transmits the PIN code to the broadcast application via the Internet 90 (S163). The PIN code (text data of the PIN code) is received by the reception device 50.

In the reception device 50, the PIN code from the server application is displayed on the display unit 522 by the broadcast application (S173). In this way, the user confirming the PIN code displayed on a screen of the reception device 50 reads the PIN code.

Here, for example, when the user reads the PIN code along with a predetermined keyword (command word) as in "Service A ask TV Show to activate PIN **" (**: the displayed PIN code), the PIN code read by the user can be recognized on the sound agent service side.

In the sound processing device 60, the sound processing unit 611 determines whether the PIN code read by the user can be recognized (S174). In a case in which it is determined in step S174 that the PIN code may not be recognized, the determination process of step S174 is repeated. In the sound processing device 60, in the case in which the PIN code may not be recognized, the user can read the PIN code again.

Conversely, in a case in which it is determined in step S174 that the PIN code can be recognized, the process proceeds to step S175. In step S175, the communication I/F 613 of the sound processing device 60 transmits the sound data of the PIN code read by the user via the Internet 90.

Moreover, although not described to facilitate the description, the sound data of the PIN code from the sound processing device 60 is transmitted to the sound conversion server 20 so that the sound data can be converted into the text data. The text data of the PIN code obtained in this way is received by the function supply server 30.

In the function supply server 30, the function processing unit 311 determines whether the PIN code from the sound processing device 60 is legitimate by comparing and checking the PIN code (the text data of the PIN code) transmitted for the broadcast application with the PIN code (the text data of the PIN code) transmitted from the sound processing device 60 (S164).

In a case in which it is determined in step S165 that the PIN code from the sound processing device 60 is legitimate, the process proceeds to step S163 (S176). In step S165 (S176), the cooperation between the broadcast application activated in the reception device S on the client side and the server application activated in the function supply server 30 starts.

In this way, the broadcast application delivered to an unspecified user is associated with an attribute of a specific user using the broadcast application. That is, when the server application notifies the reception device 50 executing the broadcast application of existing identification information (PIN code) and receives a speech by a specific user confirming the notified identification information (the PIN code) by using a sound user agent service, an attribute of the specific user is associated.

When the cooperation between the applications starts in this way, the processes subsequent to the processes of steps S111 and S142 of FIG. 8 described above can be executed.

Moreover, in a case in which it is determined in step S165 that the PIN code from the sound processing device 60 is not legitimate, the process of step S166 (S176) is skipped and the broadcast application is considered not to cooperate with the server application.

The flow of the application cooperation process has been described above.

Moreover, the processing sequence in which the PIN code from the function supply server 30 is displayed on the reception device 50 such as a television receiver, the PIN code is read by the user, the sound data of the PIN code is transmitted from the sound processing device 60 has been exemplified in the description of FIG. 10. However, another notification way may be used as the way of notifying of the PIN code.

For example, in contrast to the flow of the process illustrated in FIG. 10 described above, sound data (or text data) of the PIN code from the function supply server 30 is sent to the sound processing device 60 via the Internet 90 and a sound appropriate for the PIN code is output by the sound processing device 60. Then, the user may be allowed to input the PIN code in accordance with the sound in the broadcast application executed by the reception device 50. The PIN code input in the broadcast application is received by the server application via the Internet 90 to be used in the PIN code checking process (S164) by the server application.

In addition, any of various processing sequences can be used as the processing sequence at the time of the application cooperation process. For example, the PIN code from the function supply server 30 may be displayed on a portable terminal device such as a smartphone carried by the user. Alternatively, the PIN code may not be read by the user, but the PIN code may be input from a portable terminal device such as a smartphone to be sent as text data.

Moreover, it is not necessary to execute the application cooperation process illustrated in FIG. 10 whenever the broadcast application is activated in the reception device 50. For example, the cooperation between the applications can be realized by executing the following process without executing the process illustrated in FIG. 10. That is, when it is confirmed in the process of step S164 of FIG. 10 that the PIN code is legitimate, the function supply server 30 records token information using a cookie structure of a browser. In a case in which the same broadcast application executes communication with the function supply server 30 after next time, the cooperation between the applications is realized without executing the process illustrated in FIG. 10 by using the recorded token information.

The first embodiment has been described above. In the first embodiment, the broadcast application executed by the reception device 50 on the client side cooperates with the server application executed by the function supply server 30 on the server side via the Internet 90. Thus, the user interface of the sound agent service supplied by the sound processing device 60 is considered to be usable in the broadcast application executed by the reception device 50.

Then, in the function supply server 30, when the dialogue processing with the user who is watching the broadcast content is executed, the massive database accumulated in the database 313 is narrowed down using the reproduction information obtained from the broadcast application cooperating with the server application, and then the dialogue processing is executed on the basis of the dialogue information narrowed down with the reproduction information.

For example, when data regarding television programs equivalent to all the channels of each broadcast station is accumulated as the knowledge database in the database 313 in the function supply server 30, a program and a period of time at which an actress is acting may not be specified at the time of receiving a question about only the name of the actress, and thus an appropriate answer may not be made.

On the other hand, when the data of the knowledge database can be narrowed down with the reproduction information from the broadcast application executed by the reception device 50 and the dialogue processing can be executed on the basis of the dialogue information narrowed down with the reproduction information, a television program and a period of time at which the actress is acting can be specified. Therefore, an appropriate answer can be made even at the time of receiving a question about only the name of the actress.

In this way, according to the present technology, since the broadcast application and the server application cooperate with each other at the time of reproduction of content and the user interface of the sound agent service can be used, it is possible to achieve the improvement in convenience of an operation using the sound dialogue. In addition, when the dialogue processing is executed, the reproduction information is used in the function supply server 30. Therefore, an appropriate sound dialogue can be executed with the user who is watching the broadcast content.

3. Second Embodiment

Incidentally, in the sound dialogue system 1 of FIG. 1, in order to validate (activate) the sound processing device 60 that functions as a user interface of the sound agent service, it is general for the user to speak an activation keyword determined in advance, as described above. That is, when the user speaks an activation keyword, the sound processing device 60 transmits sound data appropriate for the speech of the user to the sound conversion server 20 of the data center so that a process for a sound dialogue can be executed.

For example, in a case in which "Service A" is set as an activation keyword used to the sound agent service, the user speaks "Service A" and subsequently speaks a question, a command, or the like.

In addition, in the function supply server 30 on the server side, a plurality of server applications with different functions are activated. Therefore, in a case in which the server applications cooperate with a broadcast application activated by the reception device 50 on the client side, it is necessary to speak both the keywords "Service A" set in advance for the sound agent service and "TV Show" for using a server application with a TV show function, as the activation keywords.

However, since the user has a burden of speaking two keywords as the activation keywords, the number of keywords is preferably as small as possible. Accordingly, in the present technology, an activation keyword for a valid server application is currently registered in the sound processing device 60, so that a desired server application can be used when the activation keyword is spoken at the time of using the server application.

Specifically, as illustrated in FIG. 11, in a case in which the server application with the TV show function can be used, the user speaks "Service A, start TV Show" (where "start" is a command word). Then, the sound processing device 60 that functions as the user interface of the sound agent service is validated with the activation keyword "Service A" set in advance and sound data spoken by the user is transmitted to the sound conversion server 20 via the Internet 90.

The sound conversion server 20 allows the function supply server 30 to activate the server application with the TV show function in accordance with the command word "start." in addition, in a case in which the server application with the TV show function is normally activated by the function supply server 30, the sound conversion server 20 request the sound processing device 60 to register the activation keyword "TV Show." Thus, the activation keyword "TV Show" is registered in the sound processing device 60.

Thereafter, the sound processing device 60 recognizes the activation keyword "TV Show" for the server application with the TV show function in addition to the activation keyword "Service A" set in advance and transmits the sound data spoken by the user to the sound conversion server 20. FIG. 12 illustrates an example of a table of activation keywords recorded on the memory 612 of the sound processing device 60.

Moreover, when the server application with the TV show function executed by the function supply server 30 is invalidated, the sound conversion server 20 notifies the sound processing device 60 of a message indicating the invalidation of the server application via the Internet 90. In the sound processing device 60, the activation keyword "TV Show" is deleted from the table recorded on the memory 612 in accordance with the message.

Moreover, in the example, the activation keyword is assumed to be a text string and the sound processing unit 611 of the sound processing device 60 recognizes the activation keyword, as described above. In order to improve precision (recognition ratio) of the sound recognition, sound feature data or the like of the activation keyword may also be used.

Referring back to FIG. 11 for the description, in a case in which the activation keyword "TV Show" is registered and subsequently the user who is watching a drama questions "TV Show, Who is the actress?," the sound processing device 60 transmits the sound data of the question to the sound conversion server 20 via the Internet 90 since the activation keyword "TV Show" has been registered. As a result, for example, the sound processing device 60 replies with the name of the actress shown in the drama to the user who is watching the drama.

In a case in which the user who is watching the dram questions "TV Show, how old is she?" 10 minutes later, the sound processing device 60 transmits the sound data of the question to the sound conversion server 20 via the Internet 90. As a result, for example, the sound processing device 60 replies with the age of the actress shown in the drama to the user who is watching the drama.

In a case in which the user who is watching the drama speaks a command "Service A, turn off the room light" 15 minutes later, the sound processing device 60 controls lighting equipment connected by wireless communication such as home Local Area Network (LAN) or Bluetooth (registered trademark) at a user home so that the lighting equipment is turned on or off since the activation keyword "Service A" is an activation keyword of the sound agent service.

In a case in which the user who is watching the drama questions "TV Show, who is the actor?" 25 minutes later, the sound processing device 60 transmits the sound data of the question to the sound conversion server 20 via the Internet 90. As a result, for example, the sound processing device 60 replies with the name of the actor shown in the drama to the user who is watching the drama.

By registering the activation keyword for using the server application which is being activated on the server side in advance in the sound processing device 60 functioning as the user interface of the sound agent service, as described above, the server application with the TV show function can be used even when the user merely speaks "TV Show" without speaking "Service A."

Moreover, the activation keyword "TV Show" is valid only while the broadcast application is operating in association with the broadcast content. Therefore, when the broadcast content ends, the activation keyword can be invalidated. Accordingly, in the reception device 50, in a case in which the user is not watching the broadcast content, the activation keyword "TV Show" is considered to be invalid. Even when the user speaks "TV Show," the sound processing device 60 does not react to the activation keyword without receiving the activation keyword.

In addition, when the reception device 50 is powered off or a channel is switched, the cooperation between the broadcast application and the server application executed by the function supply server 30 may be cancelled and the activation keyword "TV Show" may be invalidated.

Further, as in a sound user interface service of the related art, the server application may be naturally invalidated due to timeout, the sound conversion server 20 may invalidate the server application, or the server application may be invalidated using an existing command word. For example, in a case in which "stop" is used as an existing command word, the server application is invalidated by speaking "Service A stop TV Show."

In addition, as described above, the sound processing device 60 manages the table (see FIG. 12) of the activation keywords and determines whether the activation keyword is valid. However, whether the activation keyword is valid may be determined by the sound conversion server 20 or the function supply server 30 instead of the sound processing device 60.

(Activation Keyword Matching Process)

Figure 13:
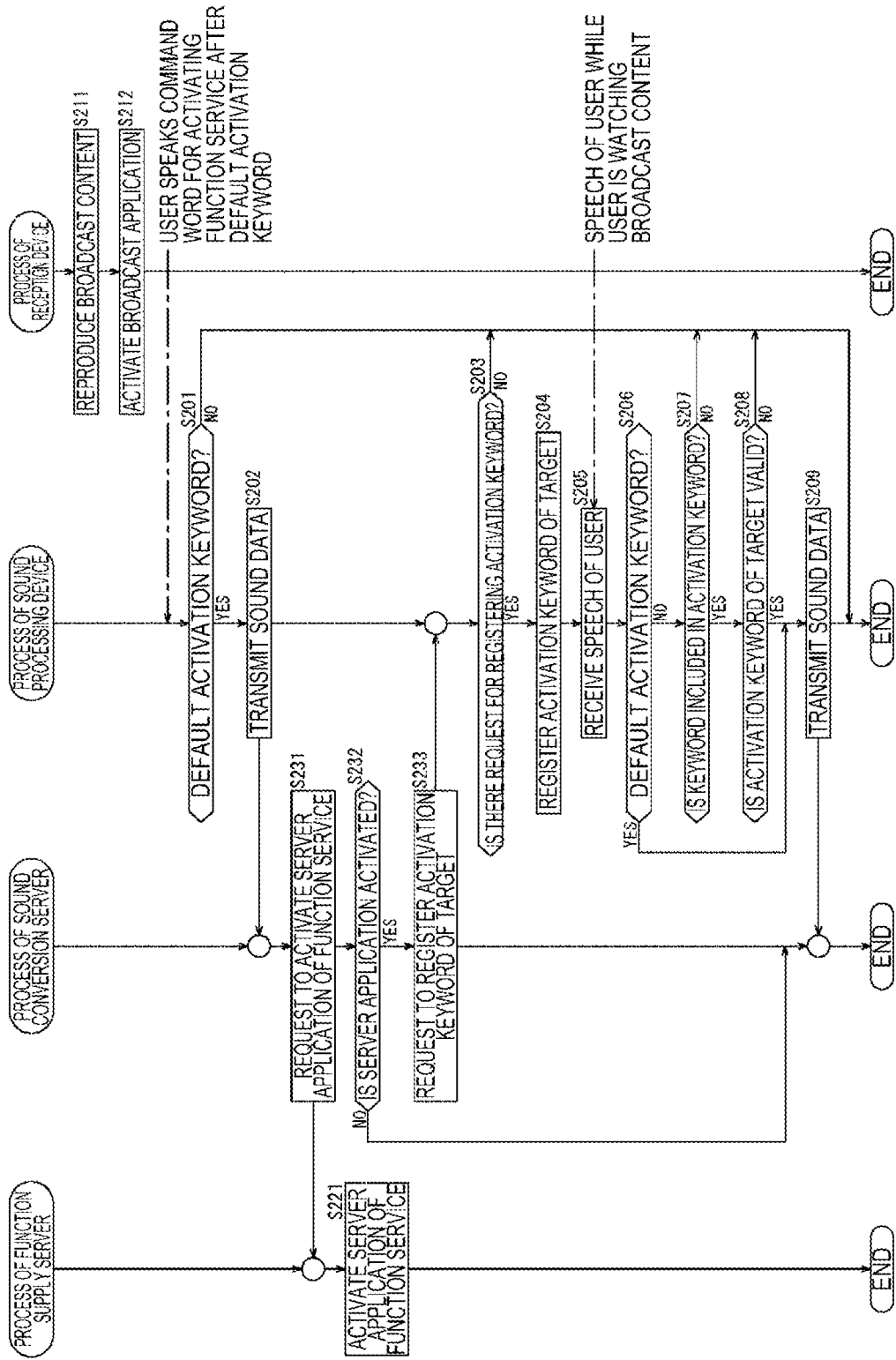
FIG. 13 is a flowchart for describing a flow of an activation keyword matching process.

Next, a flow of an activation keyword matching process will be described with reference to the flowchart of FIG. 13.

In the reception device 50, the broadcast content is reproduced (S211) and the broadcast application is further activated (S212).

In a case in which the server application is used, the user speaks a command word for activating a function service after a default activation keyword to the sound processing device 60 that functions as the user interface of the sound agent service. Here, for example, when the user speaks "Service A start TV Show," "Service A" is equivalent to the default activation keyword and "start TV Show" is equivalent to the command word for activating the function service.

In the sound processing device 60, the sound processing unit 611 determines whether words spoken by the user are a default activation keyword (S201).

In a case in which it is determined in step S201 that the default activation keyword (for example, "Service A"), the process proceeds to step S202. In step S202, the communication I/F 613 of the sound processing device 60 transmits the sound data of the speech of the user to the sound conversion server 20 via the Internet 90.

The sound data transmitted from the sound processing device 60 is received by the sound conversion server 20 via the Internet 90, and the processes of steps S231 to S233 are executed.

In the sound conversion server 20, the sound-to-text conversion processing unit 211 recognizes the command word from the sound data of the speech of the user and requests the function supply server 30 to activate the server application of the function service (S231). In the function supply server 30, the function processing unit 311 activates the server application of the function service in response to the request from the sound conversion server 20 (S221).

Here, for example, in a case in which the sound-to-text conversion processing unit 211 recognizes the command word "start TV Show," the activation of the server application with the TV Show function is requested and the server application with the TV show function is activated by the function processing unit 311.

On the other hand, in the sound conversion server 20, whether the server application is normally activated in the function supply server 30 is determined (S232). In a case in which it is determined in step S232 that the server application is normally activated, the process proceeds to step S233.

In step S233, the sound-to-text conversion processing unit 211 requests the sound processing device 60 to register the activation keyword (for example, "TV Show") of the target via the Internet 90.

The sound processing device 60 determines whether there is the request for registering the activation keyword from the sound conversion server 20 (S203). In a case in which it is determined in step S203 that there is the request for registering the activation keyword, the process proceeds to step S204.

In step S204, the sound processing unit 611 registers the activation keyword of the target from the sound conversion server 20 in the table (see FIG. 12) recorded on the memory 612. Thus, for example, "TV Show" is registered as the activation keyword for using the server application with the TV show function.

Here, in a case in which the user who is watching the broadcast content speaks, the speech can be received by the sound processing device 60 (the sound processing unit 611 of the sound processing device 60)(S205).

In step S206, the sound processing unit 611 determines whether the keyword included in the speech received in the process of step S202 is a default activation keyword (for example, the activation keyword of the sound agent service "Service A").

In a case in which it is determined in step S206 that the keyword is the default activation keyword, the process proceeds to step S209. In this case, since the activation keyword is legitimate, the sound data appropriate for the speech of the user is transmitted to the sound conversion server 20 (S209).

Conversely, in a case in which it is determined in step S206 that the keyword is not the default activation keyword, the process proceeds to step S207. In step S207, the sound processing unit 611 determines whether the keyword included in the speech received in the process of step S205 is included in the activation keyword of the table recorded on the memory 612.

In a case in which it is determined in step S207 that the keyword is included in the activation keyword, the process proceeds to step S208. In step S208, the sound processing unit 611 determines whether the activation keyword of the processing target in step S207 is valid.

In a case in which it is determined in step S208 that the activation keyword of the target is valid, the process proceeds to step S209. In this case, since the activation keyword is legitimate, the sound data appropriate for the speech of the user is transmitted to the sound conversion server 20 (S209).

In a case in which it is determined in step S201 that the keyword is not the default activation keyword ("NO" in S201) or it is determined in step S203 that there is no request for registering the activation keyword ("NO" in S203), it is not necessary to execute the subsequent processes. Therefore, the subsequent processes are skipped. Similarly, in a case in which it is determined in step S232 that the server application is not activated in the function supply server 30 ("NO" in S232), it is not necessary to execute the subsequent processes. Therefore, the subsequent processes are skipped.

Conversely, in a case in which it is determined in step S207 that the keyword is not included in the activation keyword ("NO" in S207) or it is determined in step S208 that the activation keyword of the target is not valid ("NO" in S208), the process of step S206 is skipped. In this case, since the activation keyword is not legitimate, the process of transmitting the sound data to the sound conversion server 20 is considered not to be executed.

In this way, in the sound processing device 60, in a case in which a normal context at a time of using the sound agent service and a specific context at a time of using the sound dialogue function (the TV show function) are receivable and when the activation keyword for validating the sound dialogue function (the TV show function) of the specific context is spoken by the user and is received with the sound agent service, the sound dialogue function (the TV show function) of the normal context and the specific context is validated and the specific context is received.

Then, in the sound processing device 60, only during a period in which the specific context is valid, the speech of the activation keyword for validating the sound dialogue function (the TV show function) is received with the sound agent service. In addition, the sound processing device 60 records the activation keyword for validating the sound dialogue function (the TV show function) and validates the activation keyword only during the period in which the specific context is valid, so that the specific context is received when the activation keyword is spoken by the user within the period in which the specific context is valid.

The second embodiment has been described above. In the second embodiment, the sound processing device 60 manages the table (see FIG. 12) of the activation keywords and executes the process of determining whether the activation keyword spoken by the user is valid. Therefore, for example, when the server application with the TV show function is used, the user may speak only the activation keyword "TV Show."

Therefore, for example, it is not necessary to speak both the keywords "Service A" set in advance for the sound agent service and "TV Show" for using the server application. When the server application is used, it is possible to reduce the burden on the user.

Moreover, the details described in the second embodiment can, of course, be executed alone. The details can also be executed in combination with the processes described in the first or third embodiment.

4. Third Embodiment

Incidentally, even in a case in which the broadcast application executed by the reception device 50 on the client side and the server application executed by the function supply server 30 on the server side cooperate with each other, it may be difficult for the user to recognize the cooperation of the broadcast application and the server application.

In particular, when the user is watching the broadcast content reproduced by the reception device 50 such as a television receiver, the user orients toward the reception device 50. Thus, since the user does not orient toward the sound processing device 60 that functions as the user interface of the sound agent service, a situation in which it is difficult to recognize a reaction of the sound processing device 60 occurs.

Accordingly, according to the present technology, the cooperation is displayed while the broadcast application and the server application cooperate with each other.

Figure 14:
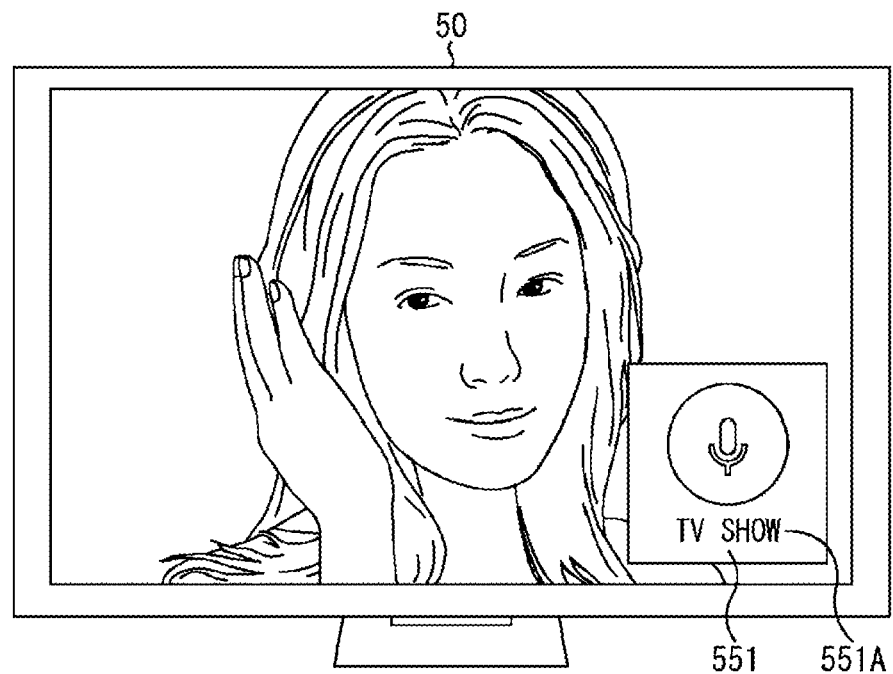
FIG. 14 is a diagram for describing an overview of a third embodiment.

Specifically, illustrated in FIG. 14, in a case in which the broadcast application and the server application cooperate with each other, a cooperation icon 551 is displayed in a lower right region to overlap on a video of the broadcast content such as a drama on a screen of the reception device 50.

The cooperation icon 551 is an icon indicating that the broadcast application and the server application are cooperating with each other. In addition, as indicated in a keyword 551A, the activation keyword of the server application can be displayed in the cooperation icon 551. In the example, the activation keyword "TV SHOW" for using the server application with the TV show function is displayed as the keyword 551A.

Moreover, in a case in which the user confirming the cooperation icon 551 speaks about the activation keyword and the sound processing device 60 is validated (activated), display appropriate for the speech of the user may be realized by the broadcast application.

(Cooperation Icon Display Process)

Figure 15:
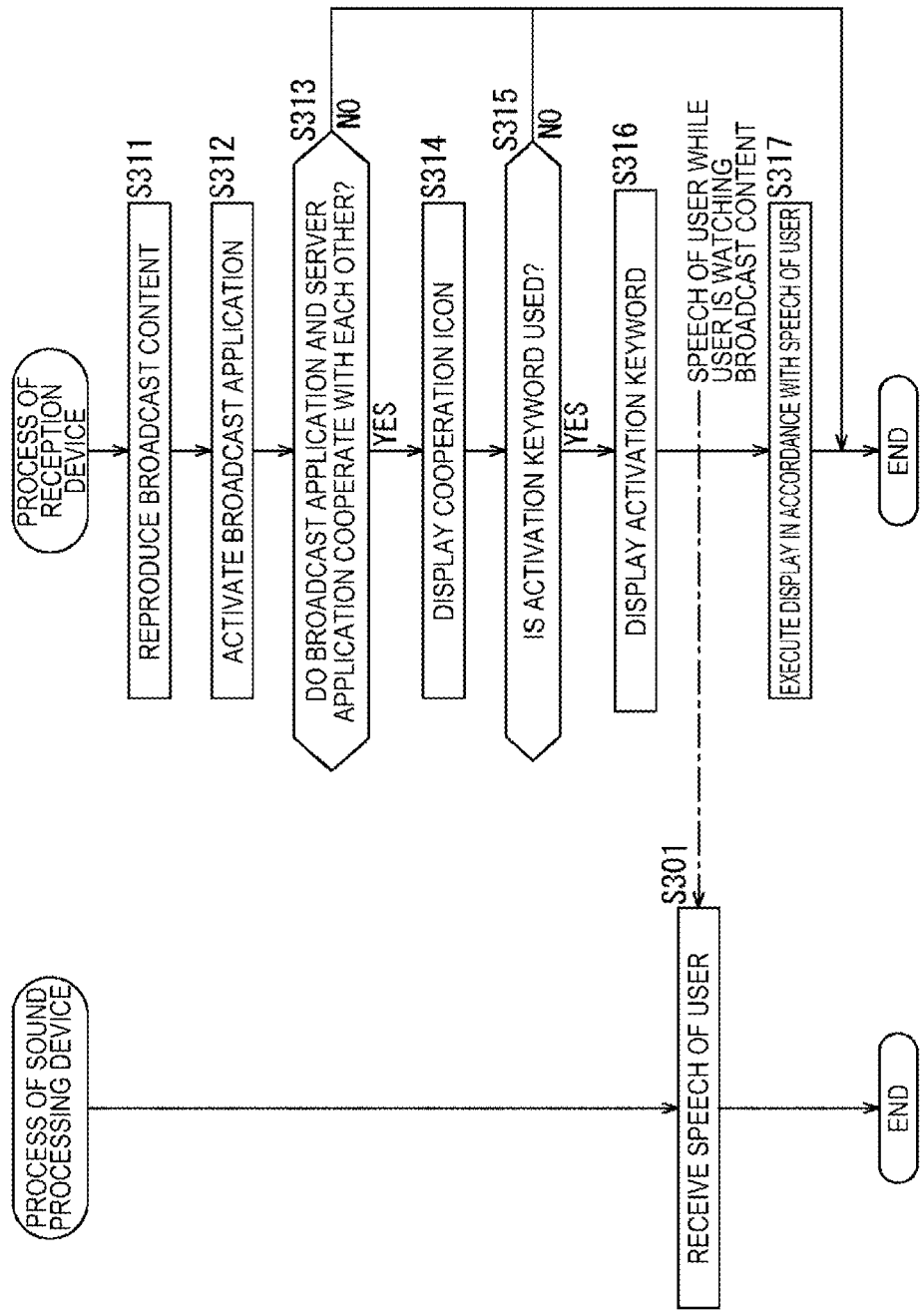
FIG. 15 is a flowchart for describing a flow of a cooperation icon display process.

Next, a flow of a cooperation icon display process will be described with reference to the flowchart of FIG. 15.

In the reception device 50, the broadcast content is reproduced (S311). Further, the broadcast application is activated (S312).

In step S313, the processing unit 511 determines whether the broadcast application and the server application cooperate with each other.

In a case in which it is determined in step S313 that both the applications cooperate with each other, the process proceeds to step S314. In step S314, the processing unit 511 displays the cooperation icon (the cooperation icon 551 in FIG. 14) in a predetermined region of the screen of the display unit 522 in accordance with the notification from the server application.

In step S315, the processing unit 511 determines whether the activation keyword is used.

In a case in which it is determined in step S315 that the activation keyword is used, the process proceeds to step S316. In step S316, the processing unit 511 displays the activation keyword (the keyword 551A of FIG. 14) so that the activation keyword is included in the cooperation icon displayed in the process of step S314.

Conversely, in a case in which it is determined in step S313 that both the applications do not cooperate with each other ("NO" in S313) or it is determined in step S315 that the activation keyword is not used ("NO" in S315), the process of step S314 or the process of step S316 are skipped. In the case, the cooperation icon is considered not to be displayed.

Here, in a case in which the user who is watching the broadcast content speaks, the speech is received by the sound processing device 60 (the sound processing unit 611 of the sound processing device 60) (S301). In a case in which the speech includes the activation keyword (for example, "TV Show"), the sound data appropriate for the speech is transmitted to the sound conversion server 20. On the other hand, in the reception device 50, display appropriate for the speech of the user is realized by the broadcast application (S317).

The flow of the cooperation icon display process has been described above.

(Display Example Other than Cooperation)

In the above description, the case in which the cooperation icon is displayed by the broadcast application in the reception device 50 has been described. However, another display way may be used as long as the cooperation information indicating that the broadcast application and the server application cooperate with each other can be displayed.

For example, as illustrated in FIG. 16, a resident application contained by the reception device 50 can display cooperation information 552 indicating that the broadcast application and the server application cooperate with each other in an upper region of the screen. In the cooperation information, the activation keyword "TV SHOW" for using the server application with the TV show function is displayed as a keyword 552A.

In addition, for example, as illustrated in FIG. 17, an operation device 70 (for example, a remote controller) capable of operating the reception device 50 such as a television receiver may be used. The operation device 70 can receive an operation related to the sound agent service. For example, when the user presses an activation button 71 of the sound agent service, the cooperation information 552 can be displayed by the resident application in the reception device 50.

Moreover, in a case in which the operation device 70 has a display function, the cooperation information 552 may be displayed on a display unit (not illustrated) of the operation device 70. In addition, in a case in which the user presses the activation button 71, the sound processing device 60 can be validated without speaking the activation keyword.

In addition, the cooperation icon 551 or the cooperation information 552 is an example of notification information for notifying the user that a specific context at the time of using the sound dialogue function (the TV show function) can be received using the sound agent service. Another information can be used when the information is information capable of notifying the user that the specific context can be received using the sound agent service. In addition, for example, as notification information, a lamp can be turned on in the reception device 50 or the operation device 70.

The third embodiment has been described above. In the third embodiment, while the broadcast application and the server application cooperate with each other, the cooperation between the broadcast application and the server application is displayed in the reception device 50. Therefore, the user can peak without hesitating about the activation keyword for using the server application.

Moreover, the details described in the third embodiment can be combined with the details described in the first or second embodiment.

5. Modification Examples (Another Configuration of Reception Device)

In the above description, the reception device 50 and the sound processing device 60 which are different devices have been described. The reception device 50 and the sound processing device 60 may be realized as an integrated device (a bundled device). For example, the bundled device can be realized by providing the sound processing device 60 as a sound processing module and providing the sound processing module in a function of the reception device 50.

In addition, in the above description, the reception device 50 has been described as a fixed receiver such as a television receiver or a mobile receiver such as a smartphone. However, the reception device 50 may be a wearable computer such as a head-mounted display (HMD). Further, the reception device 50 may be, for example, a device mounted on an automobile such as an in-vehicle television. That is, any device may be used as the reception device 50 as long as the device is a device capable of reproducing or recording content.

(Other Configurations of Servers)

In the above description, the sound conversion server 20 and the function supply server 30 has been described as different servers. However, the servers may be integrated to have the functions of both the servers.

In addition, in the above description, the sound recognition service has been supplied by the sound conversion server 20. However, the sound recognition function may be executed on the side of the sound processing device 60.

That is, the sound processing device 60 can converts the sound data spoken by the user into the text data and can transmit the text data obtained as the result to the function supply server 30 via the Internet 90. In addition, the database 213 used at the time of the conversion may be supplied by a server on the Internet 90 or may be retained by the sound processing device 60.

(Example of Broadcast Scheme)

In the above description, ATSC (in particular, ATSC 3.0) which is a scheme adopted as a broadcast scheme of broadcast content in USA and the like has been described. The present technology may be applied to Integrated Services Digital Broadcasting (ISDB) which is a scheme adopted in Japan and the like or Digital Video Broadcasting (DVB) which is a scheme adopted in European states.

In addition, in the above description, ATSC 3.0 in which an IP transmission scheme of using UDP/IP packets is adopted has been described as an example. However, the present technology is not limited to the IP transmission scheme. For example, another scheme such as MPEG2-Transport Stream (TS) scheme may be applied.

Further, the terrestrial broadcasting has been described as a transmission path for transmitting broadcast content. In the present technology, in addition to terrestrial broadcasting, satellite broadcasting in which a broadcasting satellite (BS), a communications satellite (CS), or the like is used. Alternatively, of course, a broadcasting transmission path of cable broadcasting such as cable television (CATV) or the like can be used. A communication transmission path of Internet Protocol TV (IPTV) network, the Internet, or the like can be used.

Moreover, in the sound dialogue system 1 of FIG. 1, the transmission device 10 (see FIG. 2) of a broadcast station alone including the multiplexer 115 that executes a steam multiplexing process and the transmission unit 116 that performs a modulation process or the like has been exemplified. However, in a general digital broadcasting system, the multiplexer 115 and the transmission unit 116 are installed at different locations. For example, the multiplexer 115 is installed in a broadcast station and the transmission unit 116 is installed in a transmission station.

(Example of Application)

The broadcast application is not limited to an application developed with a markup language such as HTML5 or a script language such as JavaScript (registered trademark). For example, an application developed with a program language such as Java (registered trademark) may be used. In addition, the broadcast application is not limited to being displayed, but may be executed on a background or in a non-display manner.

In addition, an application executed by the reception device 50 is not limited to an application executed by a browser, but a so-called native application may be executed in an operating system (OS) environment (presentation control environment). Further, an application executed by the reception device 50 is not limited to being acquired through broadcasting, but may be acquired through communication from a server on the Internet 90.

In addition, content reproduced by the reception device 50 is not limited to broadcast content delivered through broadcasting, but communication content delivered through communication may be used. The communication content includes, for example, content delivered in a Video On Demand (VOD) streaming manner or downloadable content. Moreover, the broadcast content and the communication content can include all kinds of content such as moving images, music, electronic books, games, and advertisement in addition to television programs (for example, news, sports, dramas, and the like) or movies.

(Others)

The names used in the present specification are examples and different names are actually used in some cases. The differences in the names are merely formal differences and the substantial details of targets are not different. For example, the above-described activation keywords are called command words in some cases.

6. Configuration of Computer

The above-described series of processes (for example, the sound dialogue process illustrated in FIGS. 8 and 9, the activation keyword matching process illustrated in FIG. 13, and the cooperation icon display process illustrated in FIG. 15) may be executed by hardware or software. In a case in which the series of processes is executed by software, a program including the software is installed on a computer of each device. FIG. 18 is a block diagram illustrating an example of a hardware configuration of a computer in which the above-described series of processes is executed by the program.

In a computer 100, a central processing unit (CPU) 1001, a read-only memory (ROM) 1002, and a random access memory (RAM) 1003 are connected to each other by a bus 1004. An input and output interface 1005 is further connected to the bus 1004. An input unit 1006, an output unit 1007, a recording unit 1008 a communication unit 1009, and a drive 1010 are connected to the input and output interface 1005.

A keyboard, a mouse, a microphone, or the like is used as the input unit 1006. A display, a speaker, or the like is used as the output unit 1007. A hard disk, a nonvolatile memory, or the like is used as the recording unit 1008. A network interface or the like is used as the communication unit 1009. The drive 1010 drives the recording medium 1011 such as a magnetic disk, an optical disc, a magneto-optical disc, or a semiconductor memory.

In the computer 100 that has the above-described configuration, the CPU 1001 executes the above-described series of processes by loading a program recorded on the ROM 1002 or the recording unit 1008 to the RAM 1003 via the input and output interface 1005 and the bus 1004 and executing the program.

The program executed by the computer 1000 (the CPU 1001) can be recorded on, for example, the removable recording medium 1011 such as a package medium for supply. In addition, the program can be supplied via a wired or wireless transmission medium such as a local area network, the Internet, or digital broadcasting.

In the computer 1000, the program can be installed on the recording unit 1008 via the input and output interface 1005 by mounting the removable recording medium 1011 on the drive 1010. In addition, the program can be received by the communication unit 1009 via a wired or wireless transmission medium and can be installed on the recording unit 1008. Additionally, the program can be installed in advance on the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

Moreover, embodiments of the present technology are not limited to the above-described embodiments, but various changes can be made within the scope of the present technology without departing from the gist of the present technology.

Additionally, the present technology may also be configured as below.

(1) A reception apparatus, including processing circuitry configured to receive a voice command related to content from a user during presentation of the content to the user, transmit the voice command to a server system for processing, and receive a response to the voice command from the server system, the response to the voice command being generated based on the voice command and content information for identifying the content related to the voice command.

(2) The reception apparatus according to feature (1), in which the content is audio or video content; and the processing circuitry is configured to decode the audio or video content for display to the user, and receive the voice command related to the audio or video content during the display of the audio or video content.

(3) The reception apparatus according to feature (1) or (2), in which the processing circuitry is configured to execute a broadcast application while the content is presented to the user, and the broadcast application is programmed to provide the content information to the server system.

(4) The reception apparatus according to any of features (1) to (3), in which the server system includes a first server and a second server; and the processing circuitry is configured to transmit the voice command to the first server included in the server system, and receive the response to the voice command from the second server included in the server system.

(5) The reception apparatus according to any of features (1) to (4), in which the voice command includes an activation word that indicates the voice command is related to the content being presented to the user.

(6) The reception apparatus according to any of features (1) to (5), in which the voice command includes a query related to the content being presented to the user, and the response to the voice command received from the server system includes an answer to the question included in the voice command.

(7) The reception apparatus according to any of features (1) to (6), in which the processing circuitry is further configured to decode the content for the presentation to the user.

(8) A method for receiving a response to a voice command, the method includes receiving the voice command related to content from a user during presentation of the content to the user; transmitting, by processing circuitry of a reception apparatus, the voice command to a server system for processing; and receiving, by the processing circuitry of the reception apparatus, the response to the voice command from the server system, the response to the voice command being generated based on the voice command and content information for identifying the content related to the voice command.

(9) The method according to feature (8), in which the content is audio or video content, the method further includes decoding the audio or video content for display to the user, and the receiving the voice command includes receiving the voice command related to the audio or video content during the display of the audio or video content.

(10) The method according to feature (8) or (9), further including executing a broadcast application while the content is presented to the user, in which the broadcast application is programmed to provide the content information to the server system.

(11) The method according to any of features (8) to (10), in which the server system includes a first server and a second server, the transmitting includes transmitting the voice command to the first server included in the server system, and the receiving the response includes receiving the response to the voice command from the second server included in the server system.

(12) The method according to any of features (8) to (11), in which the voice command includes an activation word that indicates the voice command is related to the content being presented to the user.

(13) The method according to any of features (8) to (12), in which the voice command includes a query related to the content being presented to the user, and the response to the voice command received from the server system includes an answer to the question included in the voice command.

(14) The method according to any of features (8) to (13), further including decoding the content for the presentation to the user.

(15) A non-transitory computer-readable medium storing instructions which when executed by a processor cause the processor to perform a method for receiving a response to a voice command, the method including receiving the voice command related to content from a user during presentation of the content to the user; transmitting the voice command to a server system for processing; and receiving the response to the voice command from the server system, the response to the voice command being generated based on the voice command and content information for identifying the content related to the voice command.

(16) The non-transitory computer-readable medium according to feature (15), in which the content is audio or video content, the method further includes decoding the audio or video content for display to the user, and the receiving the voice command includes receiving the voice command related to the audio or video content during the display of the audio or video content.

(17) The non-transitory computer-readable medium according to feature (15) or (16), further including executing a broadcast application while the content is presented to the user, in which the broadcast application is programmed to provide the content information to the server system.

(18) The non-transitory computer-readable medium according to any of features (15) to (17), in which the server system includes a first server and a second server, the transmitting includes transmitting the voice command to the first server included in the server system, and the receiving the response includes receiving the response to the voice command from the second server included in the server system.

(19) The non-transitory computer-readable medium according to any of features (15) to (18), in which the voice command includes an activation word that indicates the voice command is related to the content being presented to the user.

(20) The non-transitory computer-readable medium according to any of features (15) to (19), in which the voice command includes a query related to the content being presented to the user, and the response to the voice command received from the server system includes an answer to the question included in the voice command.

(21) The non-transitory computer-readable medium according to any of features (15) to (20), further including decoding the content for the presentation to the user.

(22) An information processing system, including processing circuitry configured to receive, from a reception apparatus, a voice command related to content that is presented to a user, obtain content information for identifying the content related to the voice command, generate a response to the voice command based on the voice command and the obtained content information for identifying the content related to the voice command, and transmit, to the reception apparatus, the generated response to the voice command.

(23) The information processing system according to feature (22), in which the processing circuitry is configured to obtain the content information for identifying the content related to the voice command from a broadcast application that is executed on the reception apparatus while the content is being presented to the user.

(24) The information processing system according to feature (22) or (23), in which the voice command includes an activation word that indicates the voice command is related to the content being presented to the user.

(25) The information processing system according to any of features (22) to (24), in which the voice command includes a query related to the content being presented to the user; and the response to the voice command includes an answer to the query included in the voice command.

(26) A method for processing a voice command, the method including receiving, from a reception apparatus, the voice command related to content that is presented to a user; obtaining content information for identifying the content related to the voice command, generating, by processing circuitry of an information processing apparatus, a response to the voice command based on the voice command and the obtained content information for identifying the content related to the voice command, and transmitting, to the reception apparatus, the generated response to the voice command.

(27) The method according to feature (26), in which the obtaining the content information includes obtaining the content information for identifying the content related to the voice command from a broadcast application that is executed on the reception apparatus while the content is being presented to the user.

(28) The method according to feature (26) or (27), in which the voice command includes an activation word that indicates the voice command is related to the content being presented to the user.

(29) The method according to any of features (26) to (28), in which the voice command includes a query related to the content being presented to the user; and the response to the voice command includes an answer to the query included in the voice command.

(30) A non-transitory computer-readable medium storing instructions which when executed by a processor cause the processor to perform a method for processing a voice command, the method including receiving, from a reception apparatus, the voice command related to content that is presented to a user; obtaining content information for identifying the content related to the voice command, generating a response to the voice command based on the voice command and the obtained content information for identifying the content related to the voice command, and transmitting, to the reception apparatus, the generated response to the voice command.

(31) The non-transitory computer-readable medium according to feature (30), in which the obtaining the content information includes obtaining the content information for identifying the content related to the voice command from a broadcast application that is executed on the reception apparatus while the content is being presented to the user.

(32) The non-transitory computer-readable medium according to feature (30) or (31), in which the voice command includes an activation word that indicates the voice command is related to the content being presented to the user.

(33) The non-transitory computer-readable medium according to any of features (30) to (32), in which the voice command includes a query related to the content being presented to the user; and the response to the voice command includes an answer to the query included in the voice command.

(34) An information processing device including:
a processing unit configured to execute a process related to a sound dialogue with a to user who is watching content which is a reproduction target on a basis of dialogue information narrowed down with reproduction information regarding the content among dialog information for realizing a sound dialogue function included in a database.

(35) The information processing device according to (34), in which
the processing unit executes a first application executed on a server side that is connected to the Internet, and by allowing the first application to cooperate with a second application executed on a client side that reproduces the content, a user interface supplied by a sound agent service is capable of being used to realize a sound dialogue function.

(36) The information processing device according to (35), in which the processing unit executes a process of associating the second application to be delivered to an unspecified user with an attribute of a specific user who uses the second application.

(37) The information processing device according to (36), in which
the first application notifies the client side that executes the second application of existing identification information, and
the attribute of the specific user is associated by receiving a sound speech of the specific user confirming the notified identification information using the sound agent service.

(38) The information processing device according to (36), in which
the client side that executes the second application outputs a sound appropriate for existing identification information using the sound agent service, and the attribute of the specific user is associated by receiving by the second application an input performed by the specific user confirming the output sound appropriate for the identification information.

(39) The information processing device according to (35), in which in a case in which a normal context at a time of using the sound agent service and a specific context at a time of using the sound dialogue function are receivable and when a keyword for validating the sound dialogue function of the specific context is spoken as a sound by the user and is received using the sound agent service, the sound dialogue function of the normal context and the specific context is validated and a sound dialogue of the specific context is received.

(40) The information processing device according to (39), in which only during a period in which the specific context is valid, the sound spoken as the sound of the keyword for validating the sound dialogue function is received using the sound agent service.

(41) The information processing device according to (40) in which the user interface supplied by the sound agent service is supplied by a sound processing device installed on a client side, and the sound processing device records a keyword for validating the sound dialogue function and validates the keyword only during a period in which the specific context is valid, so that the specific context is received when the keyword is spoken as a sound by a specific user within the period in which the specific context is valid.

(42) The information processing device according to any one of (34) to (41), in which the reproduction information includes at least identification information for identifying the content, positional information indicating a reproduction time position in the content, and information regarding a language of a sound or subtitles of the content.

(43) The information processing device according to any one of (35) to (42), in which
the content is broadcast content delivered as broadcast waves, and the second application is a broadcast application interlocking with the broadcast content.
(44) An information processing method of an information processing device, the method including, by the information processing device:
executing a process related to a sound dialogue with a user who is watching content which is a reproduction target on a basis of dialogue information narrowed down with reproduction information regarding the content among dialog information for realizing a sound dialogue function included in a database.
(45) A reception device including:
a reception unit configured to receive content;
a reproduction unit configured to reproduce the received content; and
a processing unit configured to process reproduction information regarding the content which is a reproduction target and transmits the reproduction information to a server side that supplies a sound dialogue function related to a sound dialogue with a user who is watching the content.
(46) The reception device according to (45), in which
the processing unit executes a second application executed on a client side that reproduces the content,
by allowing the second application to cooperate with a first application executed on the server side that is connected to the internet and supplies the sound dialogue function, a user interface supplied by a sound agent service is capable of being used to realize a sound dialogue function, and
the second application outputs a processing result obtained through the sound dialogue function.
(47) The reception device according to (46), in which
in a case in which a normal context at a time of using the sound agent service and a specific context at a time of using the sound dialogue function are capable of being received using the sound agent service, a keyword for validating the sound dialogue function is caused to be displayed and notification information appropriate for the keyword is caused to be displayed only during a period in which the specific context is receivable.
(48) The reception device according to (47), in which
the second application causes the notification information notified of by the first application to be displayed.
(49) The reception device according to (47), in which
an operation device that receives an operation related to the sound agent service causes the notification information notified of by the first application to be displayed.
(50) The reception device according to any one of (47) to (49), in which
the user interface supplied by the sound agent service is supplied by the reception device or a sound processing device installed on a client side.
(51) The reception device according to any one of (45) to (50), in which the reproduction information includes at least identification information for identifying the content, positional information indicating a reproduction time position in the content, and information regarding a language of a sound or subtitles of the content.
(52) The reception device according to any one of (46) to (51), in which
the content is broadcast content delivered as broadcast waves, and
the second application is a broadcast application interlocking with the broadcast content.

(53) An information processing method of a reception device, the method including, by the reception device:
receiving content;
reproducing the received content; and
processing reproduction information regarding the content which is a reproduction target and transmitting the reproduction information to a server side that supplies a sound dialogue function related to a sound dialogue with a user who is watching the content.

REFERENCE SIGNS LIST

1 sound dialogue system
10 transmission device
20 sound conversion server
30 function supply server
50 reception device
60 sound processing device
70 operation device
90 Internet
11 content generation unit
113 application generation unit
116 transmission unit
211 sound-to-text conversion processing unit
213 database
311 function processing unit
313 database
331 speech understanding unit
332 dialogue control unit
333 speech generation unit
511 processing unit
512 memory
514 tuner
515 demultiplexer
516 sound decoder
517 sound output unit
518 video decoder
519 video output unit
520 browser
521 speaker
522 display unit
523 communication I/F
1000 computer
1001 CPU

The invention claimed is:
1. A reception device including:
at least one processor configured to
receive content;
reproduce the received content;
process reproduction information regarding the received content which is a reproduction target;
transmit the reproduction information to a server side that supplies a sound dialogue function related to a sound dialogue with a user who is watching the received content;
execute a second application on a client side that reproduces the received content, by causing the second application to cooperate with a first application executed on the server side that is connected to the Internet; and
cause the first application to react to an activation keyword such that the first application responds to the sound dialogue without reciting a reference to a specific sound agent service,
wherein the at least one processor is configured to supply a user interface supplied by the specific sound agent service and the user interface is used to realize the sound dialogue function; and wherein the second application outputs a processing result obtained through the sound dialogue function.

2. The reception device according to claim 1, wherein a normal context at a time of using the specific sound agent service and a specific context at a time of using the sound dialogue function are received using the specific sound agent service, a keyword for validating the sound dialogue function is displayed and notification information appropriate for the keyword is displayed only during a period in which the specific context is received.

3. The reception device according to claim 2, wherein the second application causes the notification information notified by the first application to be displayed.

4. The reception device according to claim 2, wherein an operation device that receives an operation related to the specific sound agent service causes the notification information notified by the first application to be displayed.

5. The reception device according to claim 2, wherein the user interface supplied by the specific sound agent service is supplied by the reception device or a sound processing device installed on the client side.

6. The reception device according claim 1, wherein the reproduction information includes at least identification information for identifying the received content, positional information indicating a reproduction time position in the received content, and information regarding a language of a sound or subtitles of the received content.

7. The reception device according to claim 1, wherein the received content is broadcast content delivered as a broadcast signal, and the second application is a broadcast application interlocking with the broadcast content.

8. The reception device according to claim 1, wherein the reception device notifies the user via notification information when the specific context is received and the notification in performed through a lamp on a separate operation device.

9. The reception device according to claim 1, wherein the reception device notifies the user via notification information when the specific context is received and the notification in performed through a lamp on the reception device or a separate operation device.

10. The reception device according to claim 1, comprising a separate operation device having a display function, the separate operation device being configured such that, in response to the user pressing an activation button, a sound processing device can be validated without speaking.

11. An information processing method of a reception device, the method including, by the reception device:

receiving content;

reproducing the received content;

processing reproduction information regarding the received content which is a reproduction target and transmitting the reproduction information to a server side that supplies a sound dialogue function related to a sound dialogue with a user who is watching the received content;

executing a second application on a client side that reproduces the received content, by causing the second application to cooperate with a first application executed on the server side that is connected to the Internet; and causing the first application to react to an activation keyword such that the first application responds to the sound dialogue without reciting a reference to a specific sound agent service, wherein the reception device is configured to supply a user interface supplied by the specific sound agent service and the user interface is used to realize the sound dialogue function; and wherein the second application outputs a processing result obtained through the sound dialogue function.

12. The information processing method of claim 11 further comprising:

receiving a normal context at a time of using the specific sound agent service and a specific context at a time of using the sound dialogue function using the specific sound agent service;

displaying a keyword for validating the sound dialogue function; and displaying notification information appropriate for the keyword only during a period in which the specific context is received.

13. The information processing method of claim 12 further comprising, causing the second application to display the notification information notified by the first application.

14. The information processing method of claim 12 further comprising:

causing an operation device that receives an operation related to the specific sound agent service to display the notification information notified by the first application.

15. The information processing method of claim 12, wherein supplying the user interface by the specific sound agent service by the reception device or a sound processing device installed on the client side.

16. The information processing method claim of 11, wherein the reproduction information includes:

at least identification information for identifying the received content, positional information indicating a reproduction time position in the received content, and information regarding a language of a sound or subtitles of the received content.

17. The information processing method of claim 11, wherein:

the received content is broadcast content delivered as a broadcast signal, and the second application is a broadcast application interlocking with the broadcast content.

18. The reception device according to claim 11, further comprising:

notifying the user via notification information when the specific context is received, and performing the notification through a lamp on a separate operation device.

* * * * *